United States Patent
Komine et al.

(10) Patent No.: US 7,877,445 B2
(45) Date of Patent: Jan. 25, 2011

(54) COLLABORATION SERVER, COLLABORATION SYSTEM, AND METHOD AND PROGRAM FOR COLLABORATION SERVER AND SYSTEM, FOR REDUCING NETWORK TRAFFIC

(75) Inventors: Hiroaki Komine, Yamato (JP); Rika Kusuda, Yamato (JP); Masakazu Miyamoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1483 days.

(21) Appl. No.: 11/064,913

(22) Filed: Feb. 24, 2005

(65) Prior Publication Data
US 2005/0193062 A1    Sep. 1, 2005

(30) Foreign Application Priority Data
Feb. 27, 2004    (JP)    .............................. 2004-054770

(51) Int. Cl.
G06F 15/16    (2006.01)
(52) U.S. Cl. ..................................... 709/205
(58) Field of Classification Search .................. 709/205
See application file for complete search history.

(56) References Cited
U.S. PATENT DOCUMENTS
6,564,246 B1 * 5/2003 Varma et al. ................ 709/205

2002/0129139 A1 * 9/2002 Ramesh ...................... 709/224
2003/0088623 A1 * 5/2003 Kusuda ...................... 709/204

FOREIGN PATENT DOCUMENTS

| JP | 10124461 A | 5/1998 |
| JP | 2002149640 A | 5/2002 |
| JP | 2003150527 A | 5/2003 |

* cited by examiner

Primary Examiner—Shawki S Ismail
(74) Attorney, Agent, or Firm—Raymond Szeto; Hoffman Warnick LLC

(57) ABSTRACT

The present invention provides a collaboration system that reduces communication traffic, is platform- and OS-independent, and has high versatility. There are provided a collaboration server connected with a plurality of terminal apparatuses through a network for obtaining, retaining, and distributing a Web page as a work screen used in collaborative work among the terminal apparatuses, and a chat server for managing chat sessions. The collaboration server participates as a chat client in a chat session managed by the chat server and distributes an operation instruction concerning the work screen as a chat message to each terminal apparatus. The work screen is reloaded into each terminal apparatus according to the operation instruction to allow the collaborative work to progress.

12 Claims, 16 Drawing Sheets

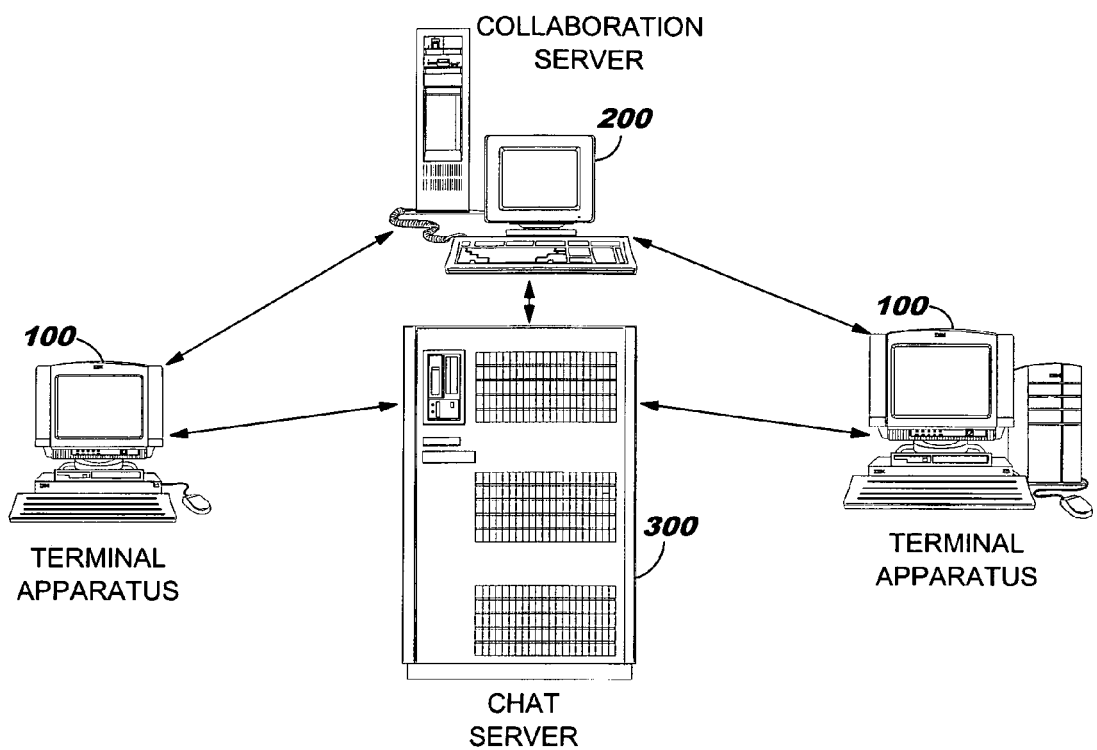
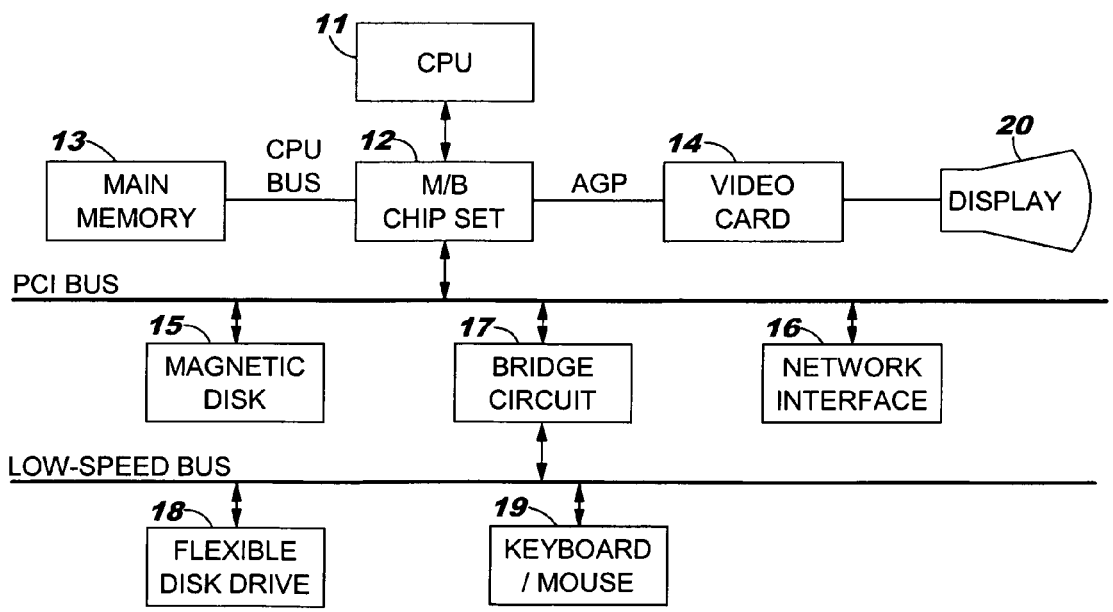

FIG. 4
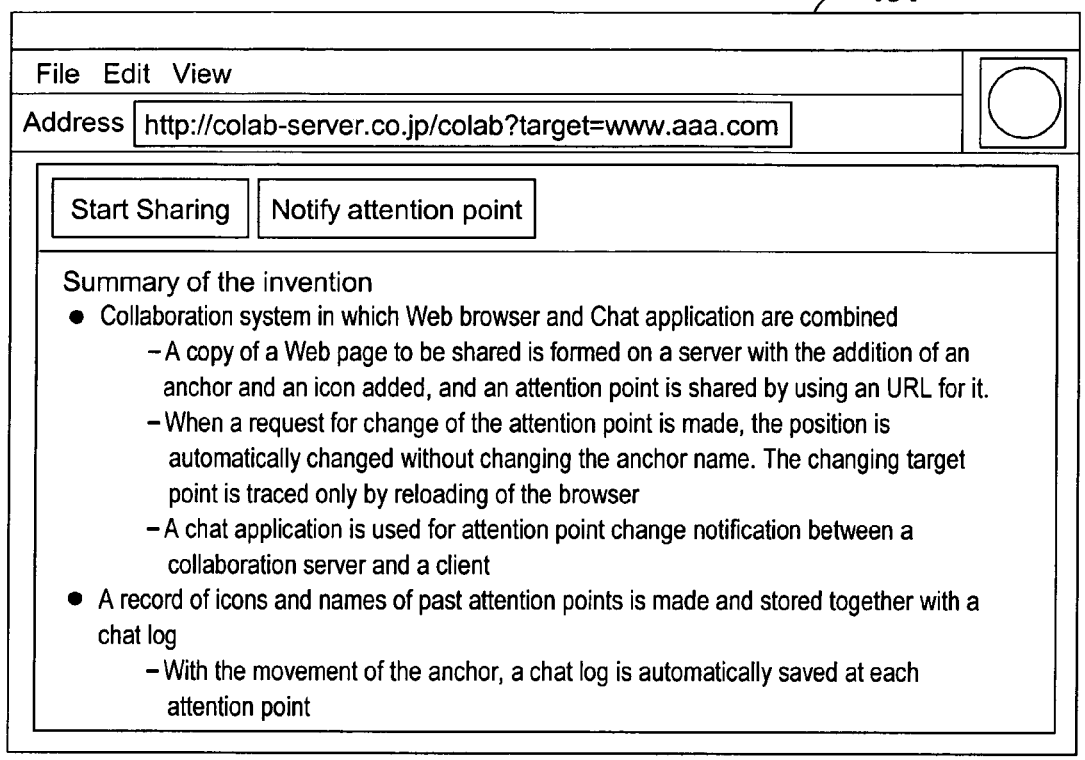
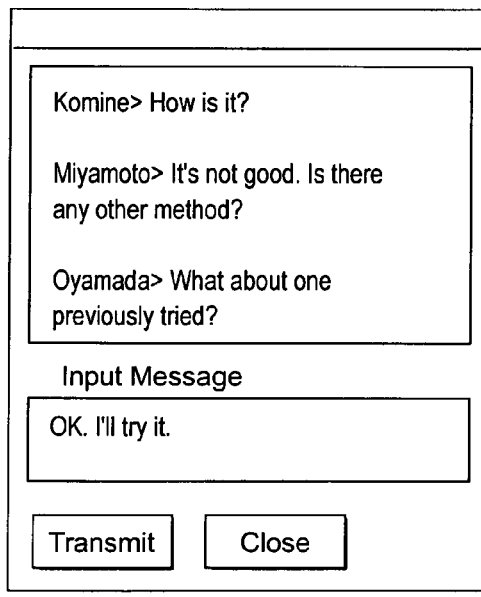

| Session ID | Leader Terminal | Participant Terminal 1 | Participant Terminal 2 | • • • |
|---|---|---|---|---|
| 1019 | 10.12.3.1 | 9.68.1.1 |  | • • • |
| 1020 | 9.68.1.1 | 9.68.4.5 |  | • • • |
| 1011 | 9.4.2.4 | 9.2.4.1 | 9.8.5.33 | • • • |
| ⋮ | ⋮ | ⋮ |  |  |

FIG. 9
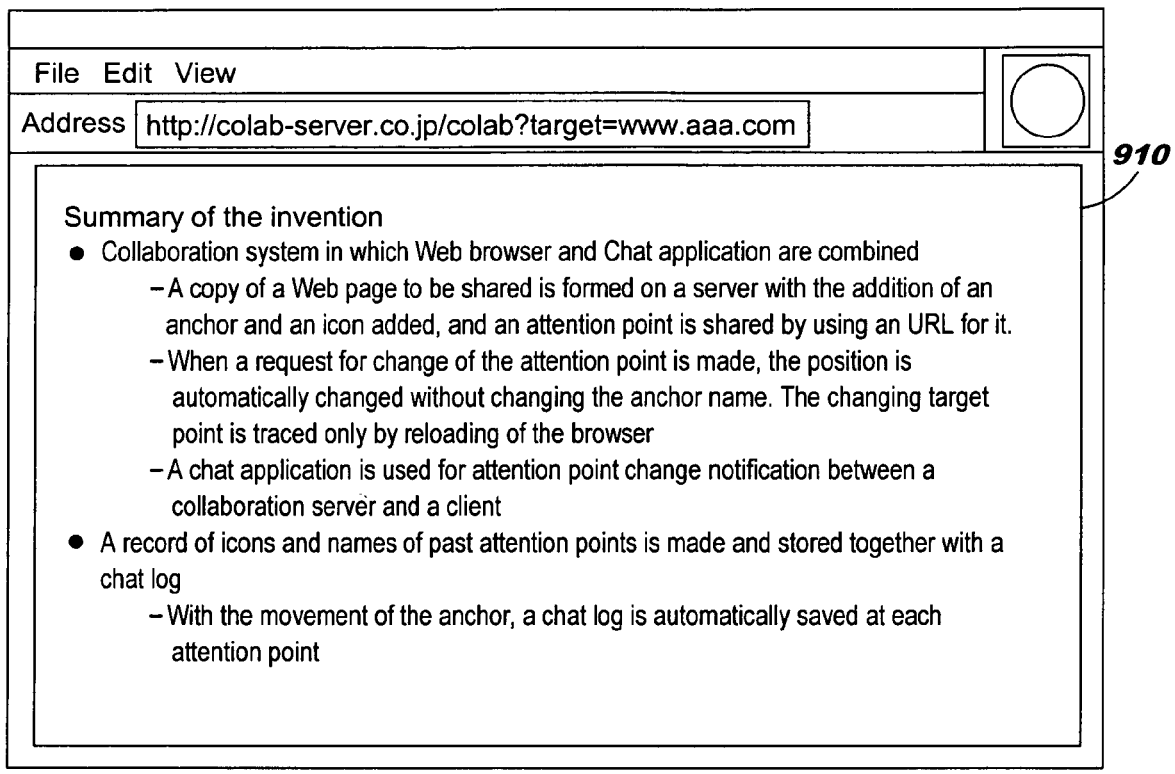
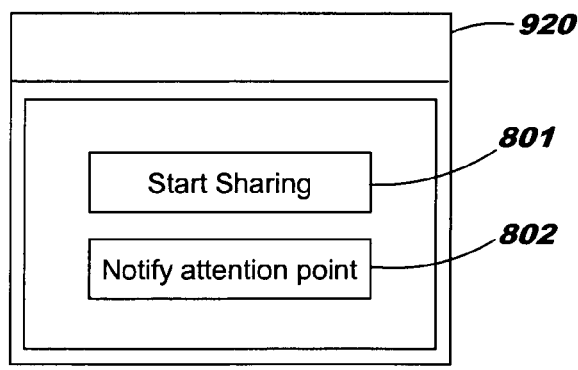

```
<HTML>
Hello
<ANCHOR "Now">
<ANCHOR "No. 1">
This is a Title
Here is a Body
</HTML>
```

FIG. 12B

```
<HTML>
Hello
<ANCHOR "No. 1">
This is a Title
<ANCHOR "Now">
<ANCHOR "No. 2">
Here is a Body
</HTML>
```

FIG. 12C

```
<HTML>
Hello
<ANCHOR "Now">
<ANCHOR "No. 1">
This is a Title
<ANCHOR "No. 2">
Here is a Body
</HTML>
```

FIG. 13

Komine> Then, the next point.

Oyamada> Is this explanation difficult to understand?

Miyamoto> Let's make it simpler.

Komine> It's difficult.

Miyamoto> What about combining it with "entire text" discussed a little while ago.

Oyamada> That's a good idea.

Komine> Oh, yes.

Oyamada> This is OK. Then, I wonder if there is also a problem with this?

Komine> Did you notice it? It's still a consideration.

Miyamoto> It's not proper.

```
<HTML>
Hello
<ANCHOR "Now">
<ANCHOR "No. 1">
This is a Title
Here is a Body
</HTML>
```

⇩

```
<HTML>
Hello
<ANCHOR "No. 1">
This is a Title
<ANCHOR "Now">
<ANCHOR "No. 2">
Here is a Body
</HTML>
```

FIG. 15
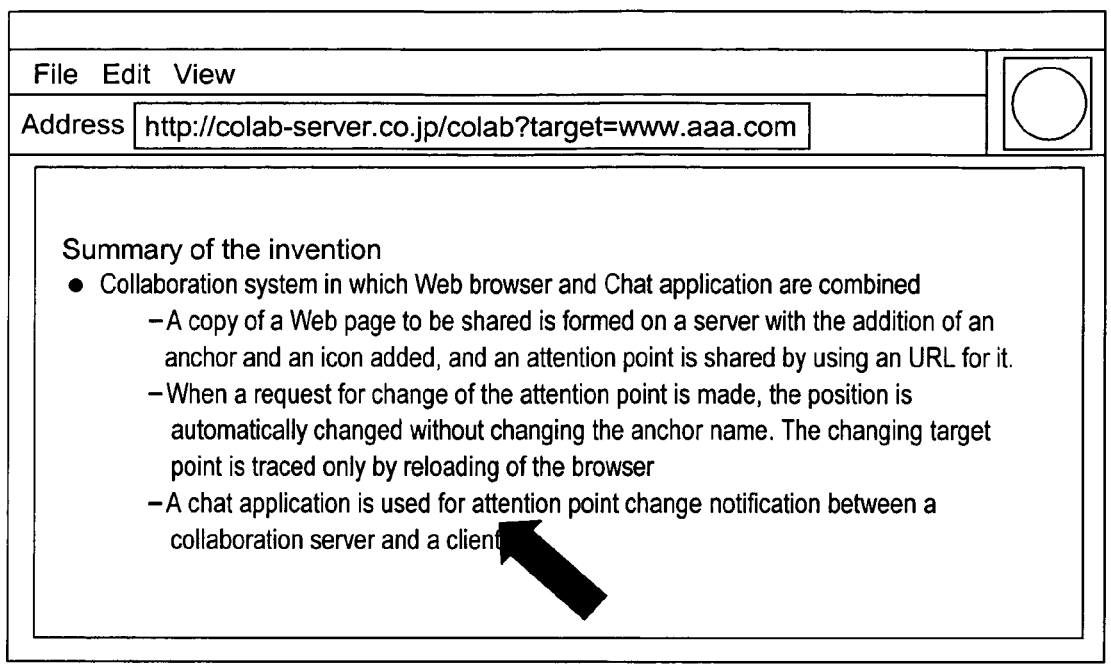
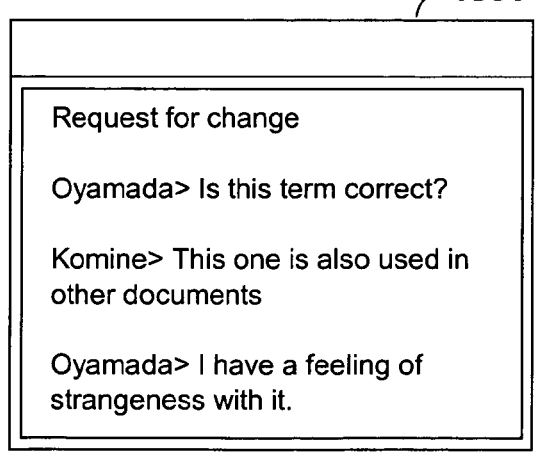

COLLABORATION SERVER, COLLABORATION SYSTEM, AND METHOD AND PROGRAM FOR COLLABORATION SERVER AND SYSTEM, FOR REDUCING NETWORK TRAFFIC

BACKGROUND OF THE INVENTION

1. Field of the Invention

The present invention relates to a collaboration system in which collaborative work is performed by using a plurality of computers connected to a network.

2. Related Art

Input/output and data processing operations can be synchronized among a plurality of computers connected to each other through a network to enable a common image to be displayed on the displays of the plurality of computers or to enable an input to one of the computers to be reflected in the other computers. Today, collaboration systems which use this technique and in which a plurality of users use a plurality of computers and perform collaborative work by displaying a common work screen image on the displays of the computers are coming into widespread use.

As an example of this kind of collaboration system, a system such as Lotus Sametime from IBM-Lotus is known in which a screen image to be displayed on the displays of computers is exchanged in the form of a bitmap image among the computers under the control of an application program to display a common screen image on the computers.

Another conventional art is a Web collaboration system in which information on operations on a Web browser is transmitted and received between computers to display the same Web page on the computers (see, for example, Japan Published Unexamined Patent Application 10-124461). As this kind of Web collaboration system, there have been further proposed a system in which a computer operated by a user obtains a Hyper Text Markup Language (HTML) file through the medium of a proxy server (collaboration server) and displays a Web page, and in which a notice of a page transition in one computer is sent to other computers to display the same Web pages on the computers (see, for example, Japan Published Unexamined Patent Application 2001-51932), and a system in which an anchor tag is embedded in an HTML file cached by a proxy server to enable identification of any place on a Web page displayed on each of computers (see, for example, Japan Published Unexamined Patent Application 2002-149640).

Further, a technique to assist communication among users participating in collaborative work by combining these collaboration systems with a so-called chat system in which text data input to one of computers is displayed on the other computers to hold a conversation in a real-time manner has been proposed (see, for example, Japan Published Unexamined Patent Application 2003-150527).

As described above, various propositions have been made with respect to collaboration systems for assisting collaborative work performed by a plurality of users using a plurality of computers interconnected through a network.

However, the conventional collaboration techniques have problems such as those described below.

In the system in which a display screen image is transmitted and received in the form of a bitmap image to display a common screen image on a plurality of computers, the amount of data communicated as image data to be transmitted and received is large and the load on the network in traffic is increased.

Also, since a bitmap image is used, displayed images vary depending on the display size and the resolution of the displays of computers. When an image is displayed on computers, there is a possibility of an edge portion of the image lying off-screen on certain ones of the computers, while the whole of the image is displayed on the other computers. Thus, there is a possibility of hindrance to collaborative work.

FIG. 20 is a diagram showing an example of display of a work screen image on displays having different resolutions in the conventional art in which a bitmap image for a work screen image is exchanged among computers.

Referring to FIG. 20, in a case where a particular point in a work screen image displayed on a high-resolution terminal A (indicated by a star-like symbol ★ in FIG. 20) is determined as an attention point, the position of the attention point is out of the display area of the work screen image in display of the work screen image on a low-resolution terminal B. In this case, it is difficult to locate the point in the work screen image to which attention is directed in collaborative work.

Further, in this system, processing dependent on an operating system (OS) is required to obtain a display screen image. Therefore, only limited kinds of OSs are usable in computers utilizing the collaboration system.

In the collaboration systems described in the above-mentioned Japan Published Unexamined Patent Applications 10-124461 and 2001-51932, a Web page is used as a display screen image and only information on operations on a Web browser may be communicated among computers, so that the communication traffic load is reduced. Also in display of an image, the Web browser is operated (by scrolling or the like) to enable the entire image to be visually recognized independently of the display size of the displays of the computers.

However, it is necessary that the computers in these systems use a common Web browser or compatible Web browsers in order to enable each of operations such as input operations on a display screen image on one of the computers based on a Web page to be reflected in the display screen images on the other computers. For this reason, only limited kinds of Web browsers and OSs are usable.

Also, if only a web page is displayed as a display screen image, it is difficult to clearly show to users participating in collaborative work to which portion of the display screen image a predetermined one of the users is paying attention.

In the system described in Japan Published Unexamined Patent Application 2002-149640, an anchor tag is embedded in an HTML file to identify any place on a display screen image (Web page) without any Web browser and OS dependences. A pointer used in collaborative work can be displayed in the identified place and scrolling of the Web browser screen image can be controlled so that the identified place is displayed.

However, this conventional art uses a stationary anchor tag embedded in an HTML file as a reference mark to perform pointer display control and Web browser scroll control. It is, therefore, necessary to prepare in each user terminal computer an application program for informing other computers of synchronization points in pointer display and screen image scrolling, and an environment in which the application program is executed. Therefore there are cases where the function provided by the system described in Japan Published Unexamined Patent Application 2002-149640 for synchronization of pointer display and screen image scrolling cannot be used, while a display screen image based on a Web page can be displayed.

In the conventional art described in Japan Published Unexamined Patent Application 2003-150527, a chat system is combined with a collaboration system to realize assistance to communication among users.

In this conventional art, however, communication between a collaboration server and user terminals is performed in the same manner as communication in other collaboration systems and, therefore, the same problem as that with one of the arts described in the previously-mentioned patent documents, i.e., the problem that only limited kinds of Web browser and OSs are usable or the problem that an execution environment for performing synchronization of the pointer display positions and screen image scrolling by using an anchor tag as a reference mark is required, still remains.

SUMMARY OF THE INVENTION

An object of the present invention is to reduce traffic communication between computers in collaborative work in a collaboration system with computers interconnected through a network.

Another object of the present invention is to provide a collaboration system having high general versatility and a method for the collaboration system in which displays and various operations are synchronized without any platform and OS dependences and without the need for any special application program.

Still another object of the present invention is to realize communication among a collaboration server and terminals for users participating in collaborative work for the purpose of implementing a collaboration system having high general versatility, having no platform and OS dependences and not requiring any special application program.

The present invention provided to achieve the above-described objects is implemented as a collaboration system described below as a system for assisting collaborative work performed by a plurality of terminal apparatuses interconnected through a network. The collaboration system has a collaboration server for obtaining, retaining and distributing a Web page as a work screen used in collaborative work among the plurality of terminal apparatuses, and a chat server for managing chat sessions, wherein the collaboration server participates in chat sessions managed by the chat server as a chat client.

The chat server has a storage storing a session management table in which information for identification of sessions in the chat and information for identification of the clients participating in the sessions are stored while being associated with each other. Information for identification of the collaboration server is registered as a client in the session management table.

The collaboration server has a work screen controller for obtaining, retaining, and distributing a Web page as a work screen used in collaborative work among the plurality of terminal apparatuses as a chat client, and a chat function performing unit for participating in a chat among the plurality of terminal apparatuses as a chat client. The chat function performing unit distributes an operation instruction concerning the work screen as a chat message to the plurality of terminal apparatuses.

More preferably, the chat function performing unit generates, in a command format readable by control means of a Web browser provided in the terminal apparatuses, a chat message in which an operation instruction concerning the work screen is described, and distributes the chat message to the terminal apparatuses.

More specifically, the work screen controller updates a data file (HTML file) for the retained Web page according to a request from one of the terminal apparatuses, and the chat function performing unit distributes, to the terminal apparatuses, as a chat message, an instruction to prompt the terminal apparatuses to reload the Web page as the work screen when an operation on the data file is performed by the work screen controller.

To be further specific, the work screen controller accepts from one of the terminal apparatuses a request made by designating a predetermined point on the Web page, writes an anchor tag (a dynamic anchor described below) to the data file for the Web page in correspondence with the point designated by the request, and adds a name of the anchor tag to an URL for the data file. Each time the work screen controller accepts from one of the terminal apparatuses a request made by designating a predetermined point on the Web page, it moves the anchor tag to the position on the data file corresponding to the point designated by the request without changing the name of the anchor tag. If this Web page is reloaded, the point at which the anchor tag is written is displayed at the top of the work screen.

Also, each time the work screen controller accepts from one of the terminal apparatuses a request made by designating a predetermined point on the Web page, it adds an anchor tag (a record anchor described below) to the data file for the Web page in correspondence with the point designated by the request, thereby facilitating return to the point set as an attention point in a collaborative work. Further, the chat function performing unit holds a log of texts exchanged in the chat, and the work screen controller accepts from one of the terminal apparatuses a request made by designating a predetermined point on the Web page, and thereafter associates the log of the chat between the acceptance of the request and the acceptance of another request subsequently made by designating another point on the Web page with the anchor tag corresponding to the predetermined point on the Web page.

Preferably, the chat function performing unit analyzes the texts exchanged in the chat to check whether or not a command to the collaboration server is contained, and, if such a command is contained, analyzes the contents of the command and makes control means of the collaboration server execute processing based on the command.

The invention provided to achieve the above-described objects is also implemented as a collaboration assisting method for assisting collaborative work performed by a plurality of terminal apparatuses, by means of a collaboration server connected to the plurality of terminal apparatuses through a network. In this collaboration assisting method, the collaboration server first distributes to the terminal apparatuses a Web page which is a work screen for collaborative work stored in a storage device. Subsequently, the collaboration server accepts a request from a predetermined one of the terminal apparatuses, and updates a data file for the Web page according to the request. The collaboration server sends, to the plurality of terminal apparatuses, as a chat message, an instruction to prompt the terminal apparatuses to reload the Web page which is the work screen.

More specifically, the step in which the collaboration updates the data file for the Web page includes a step of receiving a chat message transmitted from one of the terminal apparatuses in the chat and analyzing a text in the chat message, a step of analyzing, if the text is a command as a result of the analysis of the text, the contents of the command, and a step of executing processing required according to the command on the basis of the result of analysis of the command.

Further, the present invention can be implemented as a program for controlling a computer to perform the functions of the above-described collaboration server, or a program for executing processings corresponding to the steps in the above-described collaboration assisting method. This program can be provided by being distributed in a state of being stored on a magnetic disk, an optical disk, a semiconductor memory or any other recording medium, or by being distributed via a network.

According to the present invention arranged as described above, a work screen for collaborative work is formed by a Web page to achieve not only a reduction in communication traffic but also control of progress in collaborative work based on operation instructions provided by means of a chat message and on reloading of the Web page. Therefore, a collaboration system and method platform- and OS-independent and having high general versatility can be implemented.

BRIEF DESCRIPTION OF THE DRAWINGS

FIG. 1 is a diagram showing the overall configuration of a collaboration system according to an embodiment of the present invention;

FIG. 2 is a diagram schematically showing an example of the hardware configuration of a computer suitable for implementation of terminal apparatuses and servers of this embodiment;

FIG. 4 is a diagram showing the functional configuration of the terminal apparatus constituting the collaboration system of this embodiment;

FIG. 9 is a diagram showing an example of the form of the tool of this embodiment in a case where a "sharing start" button and an "attention point notice" button are placed in a separate window;

FIG. 12 is a diagram showing a state in which a dynamic anchor and a record anchor are written to an HTML file according to a request through the "attention point notice" button in this embodiment;

FIG. 13 is a diagram schematically showing association between a chat log and an attention point in this embodiment;

FIG. 15 is a diagram showing an example of display in a case where a jump from a work screen image to a text file of a chat log is made in this embodiment;

DETAILED DESCRIPTION OF THE INVENTION

Figure 3:
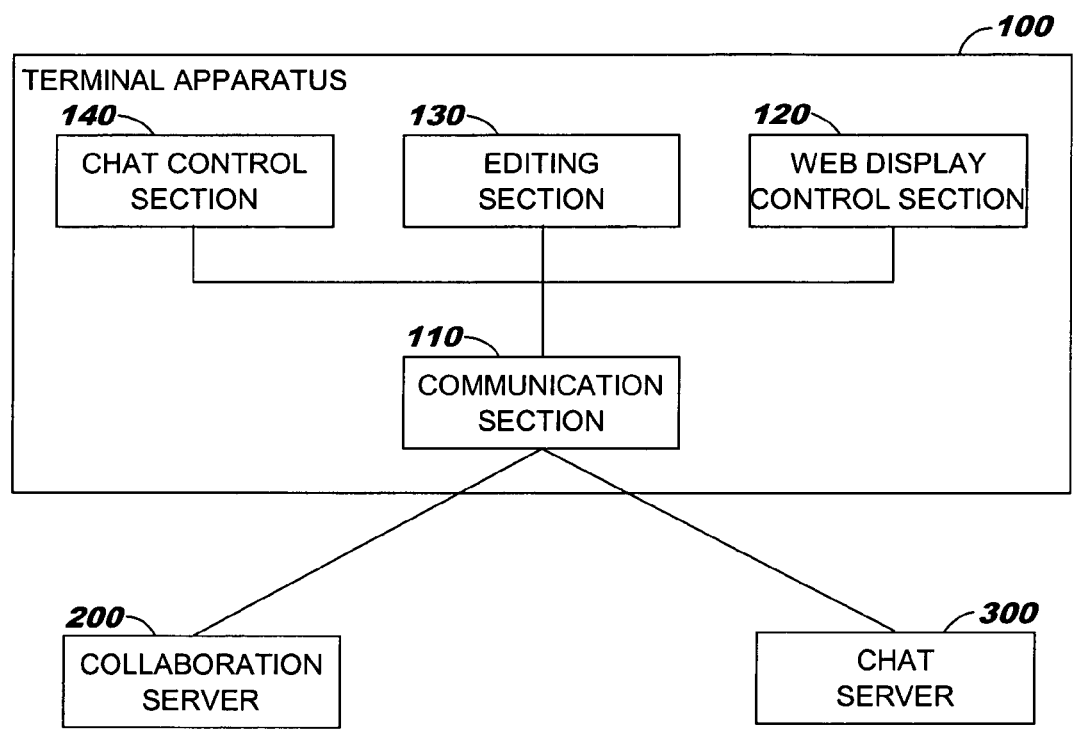
FIG. 3 is a diagram showing the functional configuration of the terminal apparatus constituting the collaboration system of this embodiment.

FIG. 1 is a diagram showing the overall configuration of a collaboration system according to an embodiment of the present invention.

As shown in FIG. 1, the collaboration system in this embodiment has a plurality of terminal apparatuses 100 for executing collaborative work, a collaboration server 200 which assists collaborative work executed by the terminal apparatuses 100, and a chat server 300 which realizes information exchange among the terminal apparatuses 100 and among the terminal apparatuses 100 and the collaboration server 200 by means of a chat system. The chat server 300, the terminal apparatuses 100, and the collaboration server 200 are connected to each other through a network which is the Internet or the like.

The collaboration system in this embodiment provides a Web page as a work screen image to be used for collaborative work. In the collaboration system, communication of operation information in collaborative work is performed by a chat. Accordingly, data transmitted and received between the apparatuses comprises a document file forming a Web page (hereinafter referred to as "HTML file"), a uniform resource locator (URL) for the Web page, a HyperText Transfer Protocol (HTTP) request, a response to the request, and chat data.

Each terminal apparatus 100 is implemented by means of an information apparatus such as a personal computer, a workstation, any other kind of computer apparatus, a personal digital assistant (PDA) having network functions, or a portable telephone. While two terminal apparatuses 100 are illustrated in FIG. 1, three or more terminal apparatuses may be connected in actuality. In the following description, the terminal apparatus 100 which starts a collaboration session and the terminal apparatus 100 which participates in the collaboration session will be referred to as a leader terminal apparatus 100*a* and a participant terminal apparatus 100*b*, respectively, if there is a need for discrimination therebetween. If there is no need for discrimination therebetween, each terminal apparatus is referred to simply as terminal apparatus 100.

Each of the collaboration server 200 and the chat server 300 is implemented by means of a personal computer, a workstation or any other kind of computer apparatus. Needless to say, the present invention is not limited to the hardware configuration shown in FIG. 1, in which the collaboration server 200 and the chat server 300 are provided as different apparatuses. The servers may be implemented by means of a physically single computer.

FIG. 2 is a diagram schematically showing an example of the hardware configuration of a computer suitable for implementation of the terminal apparatus 100, the collaboration server 200, and the chat server 300 shown in FIG. 1.

The computer shown in FIG. 2 has a central processing unit (CPU) 11, which is a computation means, a main memory 13 connected to the CPU 11 via a motherboard (M/B) chip set 12 and a CPU bus, a video card 14 also connected to the CPU 11 via the M/B chip set 12 and a Accelerated Graphics Port (AGP), and a display 20 which displays and outputs an image generated in the video card 14. Also provided are a magnetic disk unit (HDD) 15 and a network interface 16 connected to the M/B chip set 12 via a Peripheral Component Interconnect (PCI) bus, and a flexible disk drive 18 and a keyboard/mouse 19 connected to the M/B chip set 12 via the PCI bus, a bridge circuit 17 and a low-speed bus such as an industry standard architecture (ISA) bus.

FIG. 2 only shows an example of the hardware configuration of the computer for implementation of each apparatus in this embodiment, and any of other various configurations may be adopted if this embodiment is applicable. For example, a configuration may be adopted in which the video card 14 is not provided but a video memory is mounted instead and the CPU 11 processes image data. Also, a compact disc recordable (CD-R) or digital versatile disc random access memory (DVD-RAM) drive may be provided by being connected via an interface such as an AT attachment (ATA) or a small computer system interface (SCSI). In a configuration for implementation of the collaboration server 200 and the chat server 300, the provision of the video card 14, the display 20 and an input/output device such as keyboard/mouse 19 is not necessarily required.

FIG. 3 is a diagram showing the functional configuration of the terminal apparatus 100 constituting the collaboration system in this embodiment.

As shown in FIG. 3, the terminal apparatus 100 has a communication section 110 which transmits and receives HTML files and chat messages via the network, a Web display control section 120 for displaying received HTML files, an editing section 130 for editing HTML files, and a chat control section 140 for holding a chat. In a case where the terminal apparatus 100 is constituted by the computer shown in FIG. 2, the communication section 110 is implemented by means of the network interface 16; the Web display control section 120 and the chat control section 140 are implemented by means of the network interface 16; the Web display control section 120 and the chat control section 140 are implemented by means of the program-controlled CPU 11, the video card 14 and the display 20; and the editing section 130 is implemented by means of the program-controlled CPU 11. As a program for realizing the functions of the Web display control section 120, an existing Web browser can be used. As a program for realizing the functions of the chat control section 140, an existing application program for chatting can be used. As a program for realizing the functions of the editing section 130, an existing word processor or editor having the functions of editing a text and converting the edited text into an HTML file can be used.

In the collaboration system in this embodiment, information exchange among the terminal apparatuses 100 and information exchange among the terminal apparatuses 100 and the collaboration server 200 occurs in a collaboration session. That is, the user of each terminal apparatus 100 reads a chat text displayed on a chat window displayed on the display 20 by the chat control section 140 and inputs a chat message while referring to a Web page display window displayed on the display 20 by the Web display control section 120, thereby making progress in collaborative work. A concrete example of the operation when collaborative work is performed will be described in detail.

FIG. 4 is a diagram showing a window displayed on the display unit of the terminal apparatus 100.

Referring to FIG. 4, a Web page which is a work screen image is displayed in a Web page display window 401, while messages exchanged in a chat are displayed in a chat window 402. In the illustrated example, an input form for inputting a message, a button for transmitting an input message and a button for terminating a chat (shown as "Close" in FIG. 4) are provided in the chat window 402.

If the display unit of the terminal apparatus 100 has a display screen of a comparatively large size as such as that in a personal computer, progress in collaborative work can be made while both the Web page display window 401 and the chat window 402 are being simultaneously displayed. On the other hand, if the display unit of the terminal apparatus 100 has a display screen of a small size as such as that in a PDA or a portable telephone, progress in collaborative work is made while switching is being performed between display of the Web page display window 401 and display of the chat window 402.

If only operations (e.g., screen image scrolling, page changing and input to the input form) using the functions provided by a Web browser are performed as operations in collaborative work on a Web page displayed by the Web browser, the editing section 130 is not an indispensable constituent feature.

Thus, an apparatus capable of at least receiving an HTML file via a network, displaying a Web page, performing operations based on the functions of a Web browser, transmitting information on browser operations and performing input/output and transmission/reception of data in a chat may suffice as the terminal apparatus 100 in this embodiment. Therefore there is no limitation on the type of the machine or the OS or Web browser used. Instead of the computer shown in FIG. 2, the terminal apparatus 100 can be used as an information apparatus such as a PDA with a low-level capability.

Figure 5:
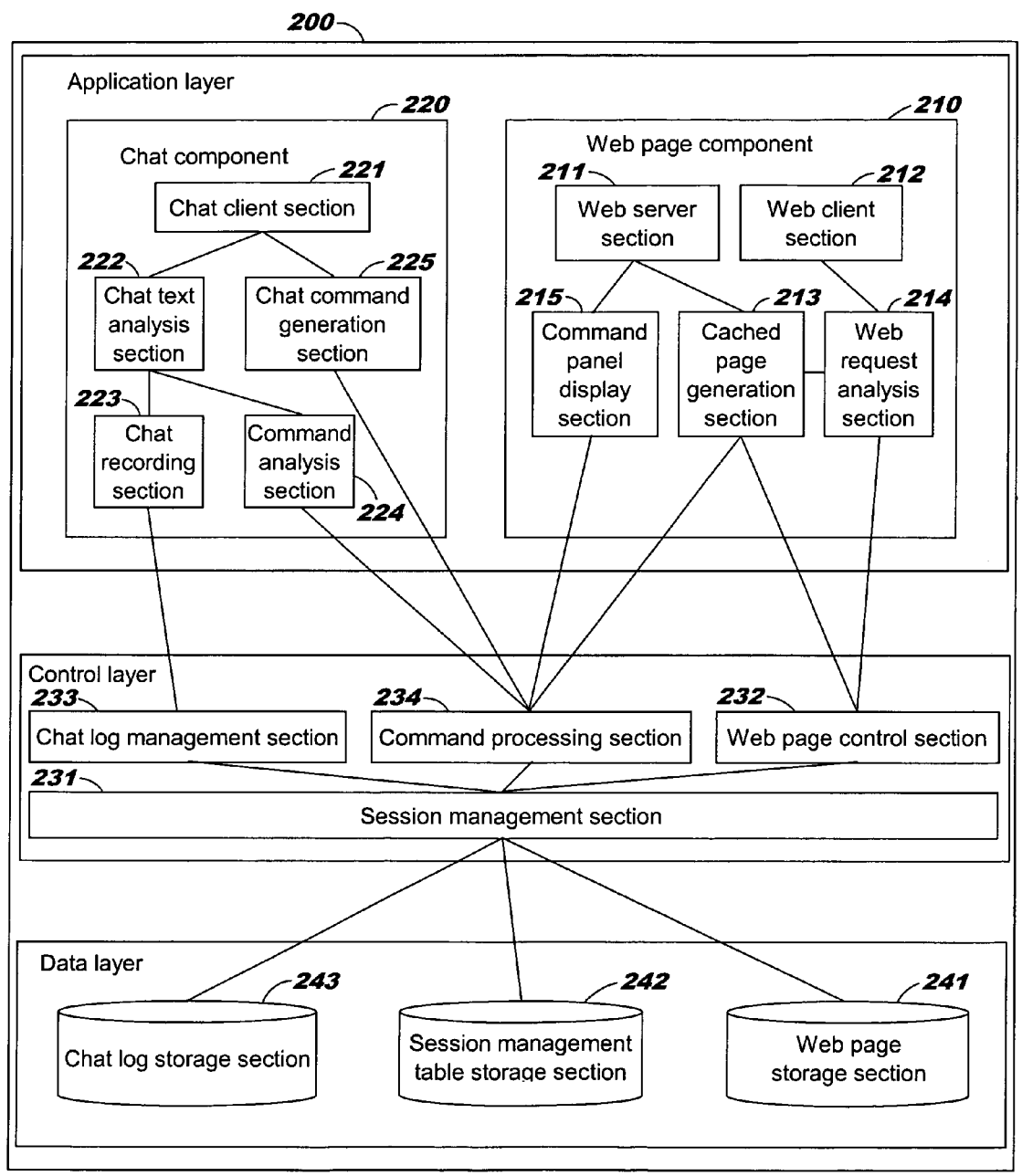
FIG. 5 is a diagram showing the functional configuration of the collaboration server constituting the collaboration system of this embodiment.

FIG. 5 is a diagram showing the functional configuration of the collaboration server 200 constituting the collaboration system in this embodiment.

As shown in FIG. 5, the functions of the collaboration server 200 include functions in an application layer, a control layer and a data layer. The application layer includes a Web page component 210 and a chat component 220. The Web page component 210, which is an application, obtains from an external Web server a Web page used as a work screen image and makes a cached page with an anchor. The Web page component 210 sends the cached Web page to the terminal apparatuses 100 and receives commands from the terminal apparatuses 100. The chat component 220 logs in as a client to the chat server 300, processes commands transmitted from the terminal apparatuses 100 via a chat, and transmits command messages from the collaboration server 200 to the terminal apparatuses 100. The chat component 220 records a chat log.

The Web page component 210 is implemented, for example, by means of the program-controlled CPU 11 shown in FIG. 2, and has a Web server section 211 having the function of operating as a Web server, a Web client section 212 having the function of operating as a client in relation to another Web server, a cached page generation section 213 for processing on a Web page in collaboration on the basis of communication with the terminal apparatuses 100, a Web request analysis section 214 and a command panel display section 215.

The Web server section 211 accepts a request from one of the terminal apparatuses 100, sends the request to the Web request analysis section 214, and sends a requested Web page (HTML file) to the terminal apparatus 100.

The Web client section 212 obtains from an external server (not shown) a Web page used as a work screen image on the basis of a command included in a request accepted by the Web server section 211 from one of the terminal apparatuses 100.

The cached page generation section 213 generates a Web page with an anchor on the basis of a Web page obtained from the Web client section 212. Data on the generated Web page is cached in the Web page storage section 241 described below.

The Web request analysis section 214 analyzes a request transmitted as an HTTP request from one of the terminal apparatuses 100 and calls up the corresponding component.

The command panel display section 215 generates a tool to be displayed on the terminal apparatuses 100. The tool will be described below.

The chat component 220 is implemented, for example, by means of the program-controlled CPU 11 shown in FIG. 2, and has a chat client section 221, a chat text analysis section 222, a chat recording section 223, a command analysis section 224, and a chat command generation section 225.

The chat client section 221 connects to the chat server 300 to participate in a chat as a chat system client.

The chat text analysis section 222 analyzes a text sent from the chat server 300 and examines on the basis of a prescribed grammar whether or not the test is a command. If the text is a command, the chat text analysis section 222 sends the text to the command analysis section 224. The chat text analysis section 222 sends text other than commands to the chat recording section 223.

The chat recording section 223 temporarily records a chat text in a storage means, e.g., the main memory 13, collects texts with respect to an attention point described below, and sends the collected texts to a chat log management section 233.

The command analysis section 224 analyzes the contents of a text recognized as a command by analysis performed by the chat text analysis section 222, and recognizes the details of the command. Details of processing according to the recognized command are transmitted to the command processing section 234.

The chat command generation section 225 generates command messages to be sent as control commands to the terminal apparatuses 100.

The functions in the control layer shown in FIG. 5 are implemented, for example, by means of the program-controlled CPU 11 shown in FIG. 2. This control layer has, as the functions of managing client sessions in collaboration, Web pages and chat logs, a session management section 231, a Web page control section 232, the chat log management section 233, and the command processing section 234.

The session management section 231 manages a collaborative work session in collaboration. Session management can be performed by using a session management table described below.

The Web page control section 232 manages a Web page with an anchor generated by the cached page generation section 213.

The chat log management section 233 manages a chat log by associating the chat log with an attention point described below. A method of associating a chat log with an attention point will be described below.

The command processing section 234 processes the actual state (details) of commands transmitted as chat and Web requests and calls up the necessary components.

The functions in the data layer are implemented, for example, by means of the main memory 13 and the magnetic disk unit 15 shown in FIG. 2. This control layer has, as the functions of storing the actual state of Web page and chat log data and session information, a Web page storage section 241, a session management table storage section 242 and a chat log storage section 243.

The Web page storage section 241 stores Web pages with anchors generated by the cached page generation section 213.

Figures 6, 7:
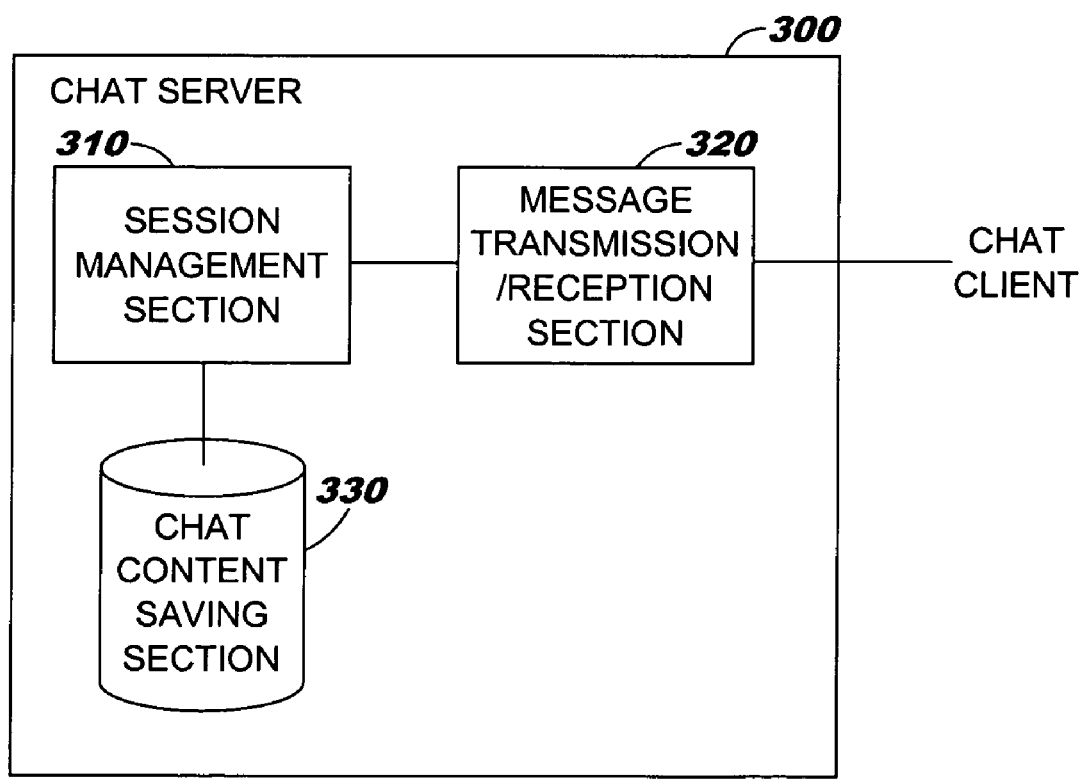
FIG. 6 is a diagram showing an example of the configuration of a session management table.
FIG. 7 is a diagram showing the functional configuration of the chat server constituting the collaboration system of this embodiment.

The session management table storage section 242 stores a session management table for managing information on collaborative work sessions in collaboration. For example, in the session management table, session IDs for sessions and addresses for the terminal apparatuses 100 participating in the sessions are registered in a state of being related to each other, as shown in FIG. 6. Discrimination information for discrimination between leader terminal apparatus 100a and participant terminal apparatus 100b is also registered. User IDs for users participating in a session may be registered instead of the addresses for the terminal apparatuses 100. In such a case, a user participating in a session can be uniquely identified from the user ID regardless of which terminal device is used by the user to participate in the session. By this identification, access control on users for example is enabled. However, if user IDs are registered, there is a need for an additional table for relating the users IDs and the addresses.

The chat log storage section 243 stores a text (chat log) having contents corresponding to exchanges in a chat.

The Web page component 210, the Web page control section 232, the command processing section 234 and the Web page storage section 241 in the configuration of the collaboration server 200 shown in FIG. 5 function as work screen image control means for performing processing on a Web page used as a work screen image. Also, the chat component 220, the chat log management section 233, the command processing section 234 and the chat log storage section 243 function as chat function execution means for making the collaboration server 200 participate as a chat client in a chat session, exchanging commands by means of chat messages and controlling the progress of collaborative work.

FIG. 7 is a diagram showing the functional configuration of the chat server 300 constituting the collaboration system in this embodiment.

As shown in FIG. 7, the chat server 300 has a session management section 310 which manages chat sessions, a message transmission/reception section 320 which performs message exchange with chat clients by controlling the network interface, and a chat content saving section 330 which stores the contents of a chat in a storage.

In this embodiment, as described above, the collaboration server 200 accesses the chat server 300 as a chat client to participate in a chat. Accordingly, chat clients referred to in the description of this embodiment include the terminal apparatuses 100 and the collaboration server 200.

The session management section 310 is implemented, for example, by means of the program-controlled CPU 11 and storage means such as the main memory 13 and the magnetic disk unit 15 shown in FIG. 2. The session management section 310 manages sessions for chats held according to this embodiment. Session management can be performed by registering, in the same session management table as that shown in FIG. 6, session IDs for sessions and addresses for clients in the sessions (the terminal apparatuses 100 and the collaboration server 200 in the case of the chat system) to each other.

The message transmission/reception section 320, for example, comprises the program-controlled CPU 11 and the network interface 16, shown in FIG. 2, and controls the transmission/reception of messages between clients in a chat session.

The chat content saving section 330 is implemented, for example, by means of storage means such as the main memory 13 and the magnetic disk unit 15 shown in FIG. 2. The chat content saving section 330 saves a log in an executed chat session.

A method of implementing collaborative work by means of the system in this embodiment will now be described.

In this embodiment, collaborative work is carried out by performing synchronization of images displayed as a work screen image (a Web page, contents) on the terminal apparatuses 100, information exchange using the chat system, and progress control.

Description will be first made of synchronization of images displayed as a work screen image.

In this embodiment, a Web page is provided as a work screen image, as described above. Then particular information indicating a point is written to the HTML file for the work screen image Web page to indicate the particular point in the work screen image on each terminal apparatus 100 displaying the Web page.

More specifically, an HTML anchor tag is written at a desired position in the HTML file to enable synchronization of the screen display states of the terminal apparatuses 100 participating in collaborative work in such a manner that the work screen image Web page is reloaded (reread) in each terminal apparatus 100 to make a jump to the desired position in the Web page. An image tag may be further written at the position at which the anchor tag is written to link a desired image file. In this way, work screen image synchronization is performed and a portion of the Web page to which one user is directing his/her attention is indicated by a desired mark (image) to inform other participants of this attention.

In this embodiment, two kinds of anchor tags: an anchor tag for dynamically indicating a point to which attention is presently being directed (referred to as "dynamic anchor") and an anchor tag for indicating a point to which attention has been directed at least one time in collaborative work (referred to as "record anchor") are used.

A dynamic anchor dynamically indicates a point to which attention is presently being directed in collaborative work, and its description position in the HTML file is changed each time the attention point is changed. Also, a name of the dynamic anchor is added to the URL of the work screen image Web page (a link is established) to enable jumping to the portion of the Web page where the dynamic anchor of the Web page is placed, when a jump to the Web page is made (or when the Web page is reloaded).

A record anchor is described at a position at which a dynamic anchor was described in the collaborative work in the past and at a position at which a dynamic anchor is presently being described. This record anchor is used for reference to a past attention point in collaborative work and for associating a chat log with a corresponding past attention point in saving of the chat log described below.

Description will next be made of information exchange using the chat system and of work progress control.

In this embodiment, information exchange in collaborative work is performing by using the existing chat system, as described above. Further, collaborative work progress control using chat massages distributed to the terminal apparatuses 100 is realized by making the collaboration server 200 participate in a chat as a client.

More specifically, when a user participating collaborative work directs his/her attention to a predetermined point on a work screen image, the terminal apparatus 100 used by the user is operated to send information on the attention point to the collaboration server 200. The collaboration server 200 writes, according to this information, an anchor tag at the position on the HTML file for the work screen image Web page corresponding to the attention point, and updates the URL of the Web page to the URL including this anchor, as described above. The collaboration server 200 then transmits a chat message to each terminal apparatus 100 to prompt the terminal apparatus 100 to reload the Web page. If each terminal apparatus 100 reloads the Web page according to the chat message, the displayed states of the work screen image are synchronized.

To realize this, the collaboration server 200 in this embodiment obtains, by the chat client section 221 of the chat component 220 provided in the application server, texts exchanged in a chat session managed by the chat server 300. The chat texts obtained by the chat client section 221 are analyzed by the chat text analysis section 222 to be grouped into commands and texts other than the commands. Each command is analyzed by the command analysis section 224 in the control layer and processing according to the command is executed by the command processing section 234. The texts other than the commands are held by the chat recording section 223 and are stored in the shat log storage section 243 in the data layer under the control of the chat log management section 233 in the control layer.

The chat command generation section 225 is called up by control performed by the command processing section 234. When a chat message is generated by the chat command generation section 225, it is transmitted to the chat server 300 by the chat client section 221 to be distributed to the chat client terminal apparatuses 100.

When collaborative work is carried out in this embodiment, there is a need to perform operations such as those described below in each terminal apparatus 100.

1. To inform the collaboration server 200 of an attention point which should be notified to other participants in collaborative work.

2. To interpret an attention point notice message sent in a chat message from the collaboration server 200 and to produce a display on a Web page and execute reloading of the Web page in the browser according to the notice message.

As means for realizing these functions, applications modules: a tool and a helper function are prepared in this embodiment. These modules are downloaded from the collaboration server 200 to the terminal apparatus 100 and executed as functions of the Web display control section 120. Details of these modules will be described below.

The tool is a module for performing the above-described operation 1.

The tool has the following two basic functions:

1) A function to enable a person taking the leadership of collaborative work to open a Web page for a work screen image and starts sharing of the Web page (sharing starting function), and 2) A function to enable each participant in collaborative work (including the leader) to notify the other participants of his/her attention point (attention point notification function).

To realize these functions, a "sharing start button" and an "attention point notice" button are placed in the display screens on the terminal apparatuses 100 in this embodiment.

Figure 8:
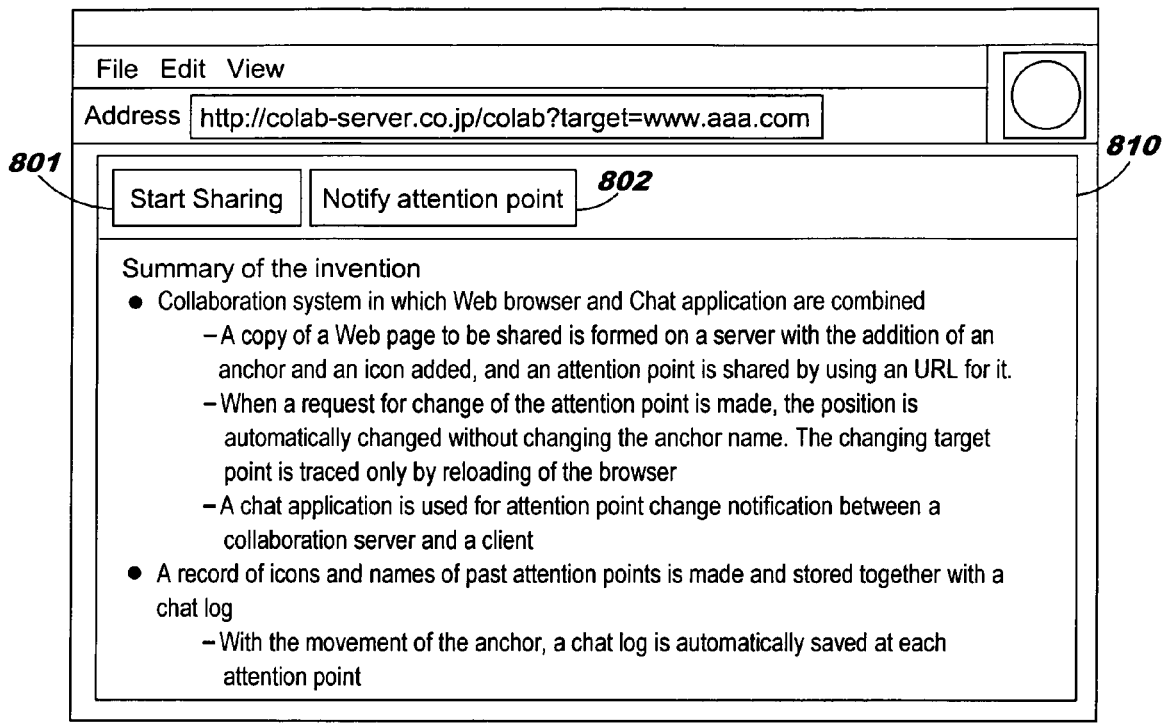
FIG. 8 is a diagram showing an example of the form of a tool of this embodiment in a case where a "sharing start" button and an "attention point notice" button are placed by using frames.

For example, a method of using the frame of a Web page and a method of opening a window different from the window in which a work screen image Web page is opened and displaying buttons in the window different from that for the Web page are conceivable as a method of placing a "sharing start button" and an "attention point notice" button. FIG. 8 shows a state in which a frame is used and a "sharing start" button and an "attention point notice" button are placed. FIG. 9 shows a state in which a "sharing start" button and an "attention point notice" button are placed in a separate window.

In the example shown in FIG. 8, an HTML file which enables display of a Web page having two or more frames is used, and a command panel 810 in which a "sharing start" button 801 and an "attention point notice" button 802 are placed is displayed in one of the frames of the HTML file. The Web page to be shared (used as a work screen image) is displayed in the other frame. In the example shown in FIG. 9, a window 920 in which a "sharing start" button 801 and an "attention point notice" button 802 are placed is displayed.

The command panel 810 shown in FIG. 8 or the window 920 shown in FIG. 9 is displayed by the command panel display section 215 shown in FIG. 5.

The helper function is a module for performing the above-described operation 2.

The helper has the function of analyzing a command message transmitted as a chat message from the collaboration server 200 and operating the Web browser according to the contents of the command message to perform display and redisplay (reloading) of a Web page. The helper has no user interface and operates in the background at the time of execution of collaborative work. The helper is not an indispensable constituent feature, and the operations performed by means of the helper may be replaced with manual operations. That is, in the case of performing such manual operations, the user of terminal apparatus 100 may read the chat message and execute the operation for display/redisplay of the Web page according to the contents of the chat message. Implementation of the helper depends on implementation of the Web browser and the chat application program in the terminal apparatus 100. Therefore, if the terminal apparatus 100 is a PDA or a portable telephone, there is a possibility of the helper being unusable depending on the system. In such a case, the operation for Web page display/redisplay is manually performed.

The operation of the thus-arranged collaboration system for collaborative work will now be described.

The operation for collaborative work in this embodiment has three phases: (1) starting of collaborative work, (2) synchronization of contents display and (3) saving of a chat log. The operation will be described with respect to the phases.

(1) Starting of Collaborative Work

Participants in collaborative work (including the leader and the collaboration server 200) establish a chat session in an initial operation stage before a start of a collaborative work session using a Web page. Since as described above the existing system can also be used as the chat system used in this embodiment, the operation for establishing a chat session is based on the conventional method. For example, the user of a predetermined one of the terminal apparatuses 100 who participates in collaborative work starts the chat application program in his/her own terminal apparatus 100 to transmit a request for establishment of a chat session to the chat server 300. In response to this, a session management table is formed in the chat server and the session ID for an established session and the address of the terminal apparatus 100 are registered in the session management table to be managed by the session management section 310. Other users access the chat server 300 from their terminal apparatuses 100 and transmit a request for participation by designating the session ID. The addresses of the terminal apparatuses 100 are then registered in the session management table to enable the users of the terminal apparatuses 100 to participate in the established session.

A request for participation in the chat session is also sent from the chat client section 221 in the chat component 220 of the collaboration server 200, and the collaboration server 200 is registered as a chat client in the session management table. The users who participate in collaborative work can notify establishment of a chat session for collaborative work to each other by suitable means and perform the above-described operation for establishment of the chat session. However, the collaboration server 200 cannot know when the chat session is established. Therefore, when a new chat session is established, an induction procedure is required to notify the collaboration server 200 of establishment of the new chat session and to make the chat client section 221 of the collaboration server 200 participate in the chat session.

For example, the session management section 310 of the chat server 300 sends a notice to the collaboration server 200 when a new chat session is established to make the chat client section 221 operate to transmit participation request from the collaboration server 200 in response to the notice. In this manner, the collaboration server 200 can automatically participate in a new chat session when the new chat session is established. Alternatively, the collaboration server 200 may be registered in a prepared session management table in the session management section 310 when a new session is established, and the session ID may be notified from the chat server 300 to the collaboration server 200. Further, since a request for obtaining a Web page is sent from one of the terminal apparatuses 100 to the collaboration server 200 to start collaborative work as described below in detail, the session ID may be notified at the time of sending this request and the chat client section 221 may be made to operate so as to transmit a participation request from the collaboration server 200 on condition that this request is received.

After a chat session has been established in the above-described manner, a Web page to be used as a work screen image is obtained and collaborative work is started.

Figure 10:
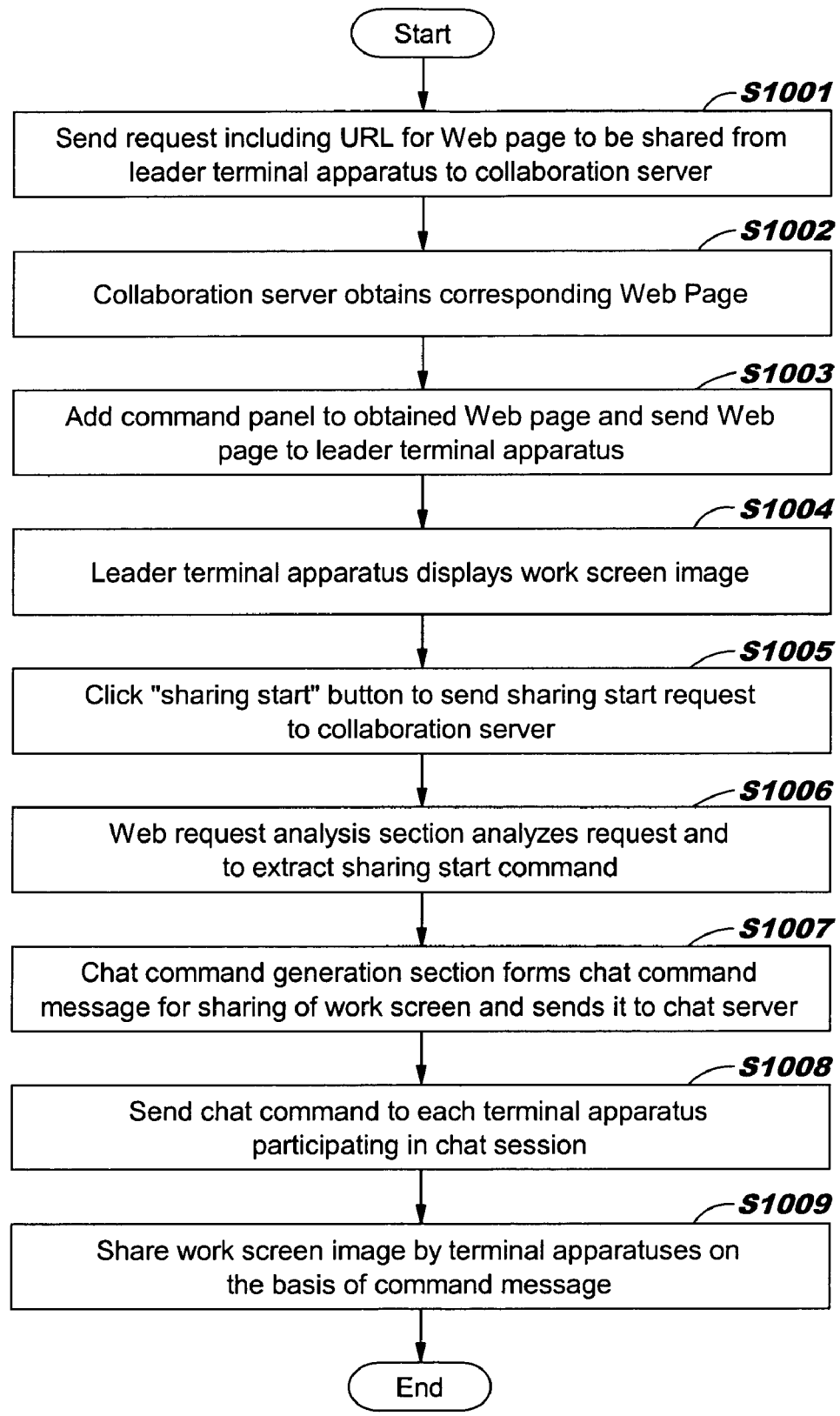
FIG. 10 is a flowchart showing the flow of the operation at the time of a start of collaborative work according to this embodiment.

FIG. 10 is a flowchart showing the flow of the operation at the time of starting collaborative work.

Referring to FIG. 10, when a predetermined user starts collaborative work, the user accesses the collaboration server 200 by using the terminal apparatus 100 and transmits a request including the URL of a Web page to be shared (that is, used as a work screen image for collaborative work) (step S1001). This terminal apparatus 100 will be referred to as leader terminal apparatus 100a, and the user of the leader terminal apparatus 100a will be referred as to the leader.

In the collaboration server 200, the Web server section 211 in the Web page component 210 receives this request, the Web request analysis section 214 analyzes this request to extract the URL, and the Web client section 212 obtains, on the basis of the extracted URL, the corresponding Web page from a Web server on the network. The cached page generation section 213 then describes a dynamic anchor in the HTML file so as to indicate the head of the Web page, and the Web page control section 232 caches the HTML file with the description of the dynamic anchor in the Web page storage section 241 (step S1002). If in the URL of the HTML file with the description of the dynamic anchor the URL of the cached HTML file for a work screen image is http//www.aaa.com/bbb.html and if the name of the dynamic anchor is "Now," the URL contained in the command message is http//www.aaa.com/bbb.html#Now.

The Web server section 211 adds the above-described tool to the cached HTML file and sends back the HTML file and the tool to the leader terminal apparatus 100a (step S1003). In this embodiment, the command panel 810 in which the tool is placed in a work screen image is displayed. In this case, an HTML file for a work screen image having two frames and a combination of the command panel 810 and the requested Web page as shown in FIG. 8 is formed by the command panel display section 215, and is transmitted from the Web server section 211 to the leader terminal apparatus 100a. In a case where the tool is displayed in a separate window such as shown in FIG. 9, the HTML file for the requested Web page and the HTML file for display of the tool are transmitted to the leader terminal apparatus 100a.

When the leader terminal apparatus 100a receives this HTML file to which the command panel 810 is added, the Web display section 120 opens the window for work screen image display and displays the work screen image (step S1004). This work screen image has two frames such as shown in FIG. 8, the command panel 810 being displayed in one frame, the request Web page being displayed in the other frame.

The leader then clicks the "sharing start" button 801 in the displayed command panel 810 to transmit a request including a sharing start command to the collaboration server 200 (step S1005).

In the collaboration server 200 accepting this request, the Web request analysis section 214 analyzes the request and extracts the sharing start command (step S1006). The command processing section 234 calls up the chat command generation section 225 according to this command. The chat command generation section 225 forms a command message for sharing the work screen image between the terminal apparatuses 100 and transmits the command message to the chat server 300 via the chat client section 221 (step S1007). This command message contains the URL of the work screen image HTML file formed in step S1003.

The chat server 300 transmits this command message (chat message) to the terminal apparatuses 100 participating in the chat session on the basis of the session management table and saves the command message to the chat content saving section 330. (step S1008).

In each terminal apparatus 100, the Web page is displayed on the basis of the received chat message (step S1009). At this time, it is not necessary for the leader terminal apparatus 100a to perform any operation according to the chat message received from the chat server 300 since the work screen image has already been displayed. In the other terminal apparatuses 100, the Web display control section 120 extracts the URL of the work screen image HTML file from the chat message received from the chat server 300, opens the window for display of the work screen image and displays the work screen image as shown in FIG. 8. Each of the terminal apparatuses 100 other than the leader terminal apparatus 100a will be referred to as participant terminal apparatus 100b.

The operations for extracting the URL from the chat message, obtaining the Web page and displaying the Web page in the work screen image display window are automatically performed by the helper if the helper is implemented in the terminal apparatuses 100. The method of extracting the URL from the chat message by means of the helper will be described in detail.

In a case where the helper is not implemented in the terminal apparatuses 100, the chat control section 140 in each terminal apparatus 100 displays in the chat window the chat message received from the chat server 300, and the user of the terminal apparatus 100 operates the Web display control section 120 on the basis of the displayed chat message to obtain the work screen image HTML file cached in the collaboration server 200 and display the Web page in the window for display of the work screen image.

Thus, the Web page provided as a common work screen image is displayed on the leader terminal apparatus 100a and the participant terminal apparatuses 100b and the common work screen image is shared. While according to the above description it is not necessary for the leader terminal apparatus 100a to perform any operation in step S1009, the leader terminal apparatus 100a may extract the URL contained in the chat message received from the chat server 300 and reload the HTML file for the work screen image.

While a chat session is established before a start of collaborative work in the above-described example of the operation, the collaboration server 200 based on the existing chat system functions can independently establish a chat session by accessing the chat server 300 and induce the leader terminal apparatus 100a and the participant terminal apparatuses 100b even in a case where not chat session is established in advance.

(2) Synchronization of Contents Display

After starting collaborative work while sharing the work screen image among the terminal apparatuses 100, it is necessary to synchronize, among the terminal apparatuses, content displays based on the operations executed in the terminal apparatuses 100. It is possible to perform operations on the work screen image from either of the leader terminal apparatus 100a and the participant terminal apparatuses 100b except when a restriction described below is imposed. However, description will be made of an example of synchronization easier to explain, i.e., synchronization in the participant terminal apparatuses 100b of results of an operation performed in the leader terminal apparatus 100a.

Figure 11:
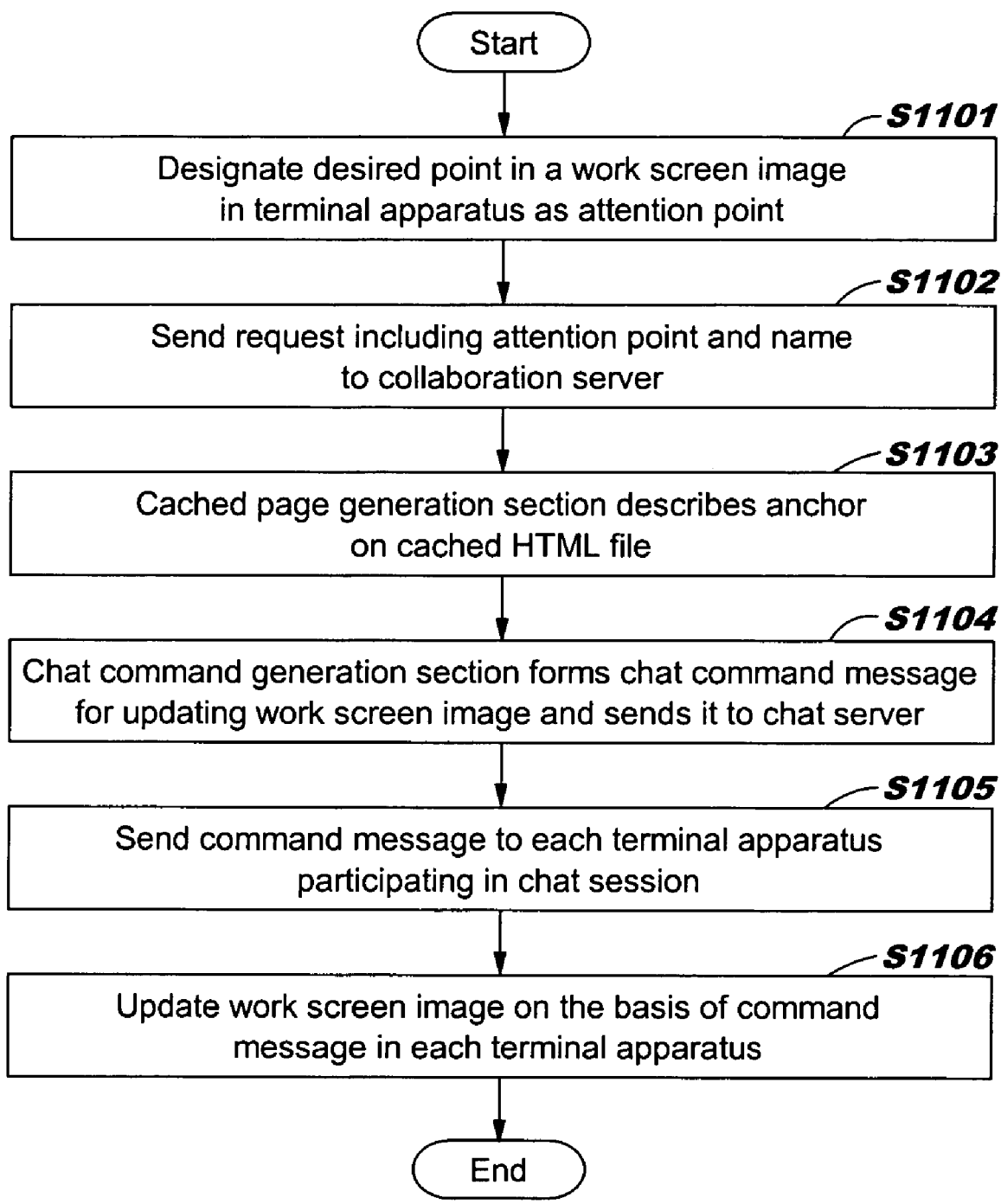
FIG. 11 is a flowchart showing the flow of the operation for synchronization of content displays according to this embodiment.

FIG. 11 is a flowchart showing the operation when content displays are synchronized.

Referring to FIG. 11, the leader first designates a predetermined point in the work screen image as an attention point in the leader terminal apparatus 100a (step S1101). Designation of an attention point is performed, for example, by mouse-clicking the corresponding point in the work screen image. The leader then mouse-clicks the "attention point notice" button 802 in the command panel 810 in the work screen image. A request including information on the attention point in the work screen image is thereby transmitted to the collaboration server 200 (step S1102). This request includes information for locating the attention point in the Web page provided as the work screen image and a name of the attention point. The name of the attention point may be arbitrarily given. For example, attention points may be numbered in order of setting of them made in collaborative work.

In the collaboration server 200 accepting this request, the Web analysis section 214 analyzes the request. The cached page generation section 213 reads out, through the session management section 231 and the Web page control section 232, the HTML file cached in the Web page storage section 241, and writes anchor tags according to the details of the request (step S1103). The HTML file to which anchor tags are written according to the request is again stored as a latest cached data in the Web page storage section 241.

Writing of anchor tags to the HTML file will be described in detail.

There are two kinds of anchor tags: a dynamic anchor and a record anchor written to the HTML file in this embodiment, as described above.

The dynamic anchor is given a fixed name (which may be freely selected but it is assumed here that a name "Now" is given). Each time a request is transmitted from the terminal apparatus 100 to the collaboration server 200 by clicking on the "attention point notice" button 802, the dynamic anchor is moved to the position on the HTML file corresponding to the attention point designated by the request.

On the other hand, names included in requests transmitted from the terminal apparatus 100 to the collaboration server 200 are attached to record anchors (it is assumed here that consecutive numbers are used as names included in requests, and names are given as "No. 1," "No. 2," . . . on the basis of the consecutive numbers). Each time a request is transmitted by clicking on the "attention point notice" button 802, a record anchor is additionally written to the position on the HTML file corresponding to the attention point designated by the request.

FIG. 12 is a diagram showing a state in which a dynamic anchor and a record anchor are written to the HTML file according to a request through the "attention point notice" button 802.

First, a predetermined point on the work screen image is designed and a request through the "attention point notice" button 802 is transmitted to the collaboration server 200. A dynamic anchor <ANCHOR "Now"> and a record anchor <ANCHOR "No. 1"> are described at the corresponding point in the work screen image HTML file according to this request, as shown in FIG. 12(A).

Subsequently, another point on the work screen image is designed and a request through the "attention point notice" button 802 is transmitted to the collaboration server 200. The dynamic anchor <ANCHOR "Now"> is moved to the corresponding position in the work screen image HTML file according to this request, as shown in FIG. 12(B). Also, a record anchor <ANCHOR "No. 2"> is added at the same position. Consequently, two record anchors <ANCHOR "No. 1"> and <ANCHOR "No. 2"> and one dynamic anchor <ANCHOR "Now"> are written in the HTML file.

In ordinary cases, a record anchor is added to the HTML file each time an attention point notice is given. The dynamic anchor is described at the position of the record anchor last added.

A return to an attention point set in the past will next be considered. For example, in a case where the attention point is returned from the state shown in FIG. 12(B) to the position of the record anchor <ANCHOR "No. 1">, a method of performing an operation on the display screen image of the browser and a method of transmitting a command in a chat message to the collaboration server 200 are conceivable. For example, in the method of performing an operation on the display screen image of the browser, the point in the work screen image corresponding to the record anchor <ANCHOR "No. 1"> designated in the past is again designated in the terminal apparatus 100 and the "attention point notice" button 802 is clicked to transmit to the Web server section 211 of the Web server component 210 a command for return to the point corresponding to the record anchor <ANCHOR "No. 1">. A return button (tool) for transmitting a command for return to an attention point in the past may be set in the command panel 810. The method of transmitting a command in a chat message to the collaboration server 200 will be described below.

In the collaboration server 200 receiving a command for return to the above-mentioned attention point in the past, the dynamic anchor <ANCHOR "Now"> is moved to the corresponding to the position in the HTML file, i.e., the position of the record anchor <ANCHOR "No. 1">, as shown in FIG. 12(C). The present attention point is thereby returned to the point corresponding to the record anchor <ANCHOR "No. 1">.

After the anchor tags in the HTML file have been updated as described above, the command processing section 234 of the collaboration server 200 calls up the chat command generation section 225. The chat command generation section 225 forms a command message for reloading the work screen image Web page in each terminal apparatus 100 and transmits the message to the chat server 300 via the chat client section 221 (step S1104).

The chat server 300 transmits this command message (chat message) to the terminal apparatuses 100 participating in the chat session on the basis of the session management table and saves the command message to the chat content saving section 330 (step S1105).

In each terminal apparatus 100, the Web page is reloaded on the basis of the received chat message to update the work screen image (step S1106). The operation for extracting the reloading instruction from the chat message and reloading the Web page to update the work screen image is automatically performed by the helper if the helper is implemented in the terminal apparatuses 100. The method of extracting the URL from the chat message by means of the helper will be described below.

In a case where the helper is not implemented in the terminal apparatuses 100, the chat control section 140 in each terminal apparatus 100 displays in the chat window the chat message received from the chat server 300, and the user of the terminal apparatus 100 operates the Web display control section 120 on the basis of the displayed chat message to reload the work screen image Web page cached in the collaboration server 200 and display the Web page in the window for display of the work screen image.

The operation for content display synchronization has been described by way of example with respect to a case where an attention point setting made in the leader terminal apparatus 100a is reflected in the participant terminal apparatuses 100b. Needless to say, an attention point setting can also be made in each of the participant terminal apparatuses 100b. However, with respect to attention point setting, (A) a restriction allowing setting only in the leader terminal apparatus 100a, or (B) a restriction allowing setting only in the leader terminal apparatus 100a in principle and allowing setting from each participant terminal apparatus 100b if it is permitted by the leader may be imposed. These restrictions can be realized by control performed by the session management section 231. Also, information as to whether or not any restriction is imposed on attention point setting by means of the participant terminal apparatus 100b may be registered in the session management table and managed.

In a case where a restriction such as the restriction (B) is imposed, there is a need to provide the leader terminal apparatus 100a with the function of permitting attention point setting by means of the participant terminal apparatus 100b. More specifically, a "attention point setting permission" button is provided in the command panel 810 for example. When this button is clicked, a command for permitting attention point setting by means of the participant terminal apparatus 100b is transmitted from the leader terminal apparatus 100a to the collaboration server 200. In the collaboration server 200 receiving this command, the session management section 231 cancels the restriction on attention point setting.

The restriction (B) may be modified so as to individually permit each of the participant terminal apparatuses 100b to make an attention point setting and control may be performed so as to enable only the leader terminal apparatus 100a and the permitted participant terminal apparatus 100b to make a setting.

(3) Saving of Chat Log

In this embodiment, the chat system is used as means for communication among participants in collaborative work. Exchanges in a chat (texts) are saved as a log in the storage of each terminal apparatus 100, the chat log storage section 243 of the collaboration server 200, the chat content saving section 330 of the chat server 300, or the like. As a chat log used as a means for communication in a collaboration work session, a log saved to the collaboration server 200 is useful.

In this embodiment, a log of a chat held when attention is directed to a predetermined point in a work screen image is saved in a state of being associated with the attention point in order that the details of collaborative work and details of information exchanged in the chat coincide with each other.

FIG. 13 is a diagram schematically showing association between a chat log and an attention point.

Referring to FIG. 13, when an attention point is moved (that is, a new attention point is set), the part of chat texts formed in the section (surrounded by the broken line in FIG. 13) from the point at which the preceding attention point (<ANCHOR "No. 1"> shown in FIG. 13) is set to the point at which a new attention point (<ANCHOR "No. 2"> shown in FIG. 13) are combined into a file to be stored in the chat log storage section 243. The text file in this chat log is associated with the preceding attention point (<ANCHOR "No. 1">).

No particular method is exclusively used for this association. However, in a case where each terminal apparatus 100 is a system such as one in personal computers capable of using a high-function browser, a device such as JavaScript (trademark of U.S. Sun Microsystems, Inc.) for performing dynamic processing in a Web page may be used to associate chat log texts to an attention point in a work screen image. In such a case, when a chat log associated with a desired attention point in the display of the terminal apparatus 100 is referred to, a pop-up window can be displayed in the vicinity of the attention point and the chat log associated with the attention point can be displayed in the pop-up window.

Figure 14:
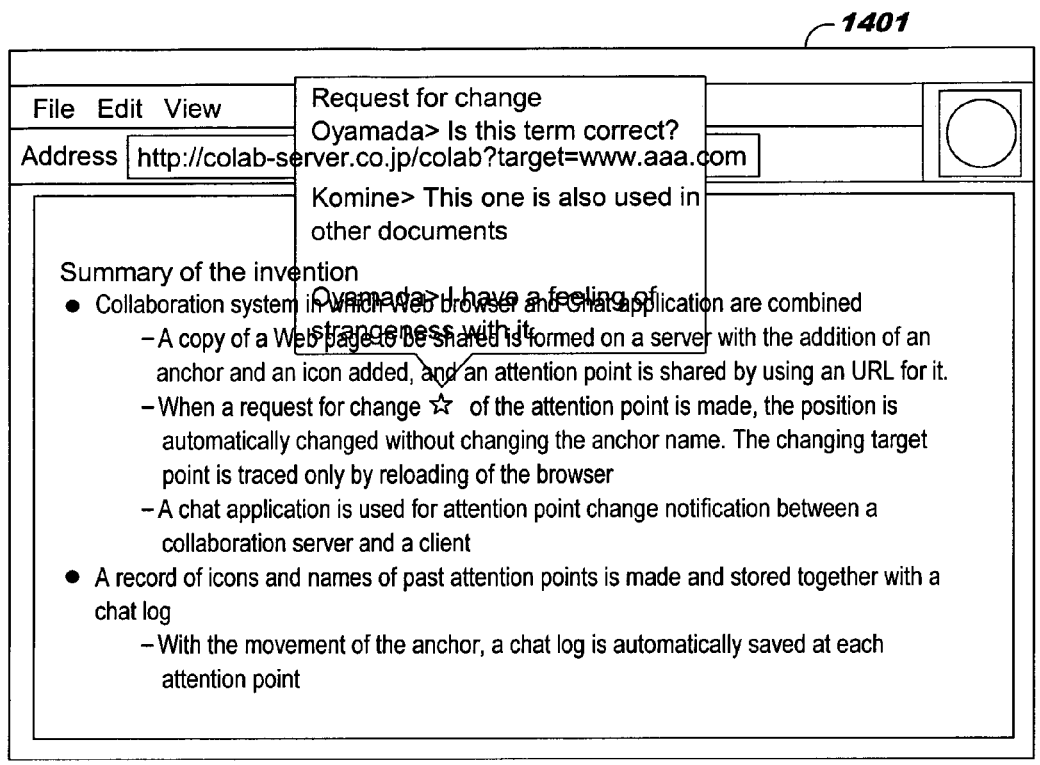
FIG. 14 is a diagram showing an example of display in a case where a chat log is displayed in a pop-up window in this embodiment.

FIG. 14 shows an example of display in a case where a chat log is displayed in a pop-up window.

A chat log is displayed in a pop-up window 1401, as illustrated.

In the case of a system such as one in PDAs or portable telephones having a low-function browser, a link to an attention point on a Web page is formed to enable association between chat log texts and the attention point in the work screen image. That is, when the attention point is moved, the text file stored in the chat log storage section 243 is given an URL from the chat log management section 233. When the cached page generation section 213 writes anchor tags to the HTML file, a link to this URL is further described. Thus, when a chat log associated with a desired attention point in the display of the terminal apparatus 100 is referred to, a jump is made to the chat log text file associated with the attention point to display the corresponding texts in the Web page display window.

FIG. 15 shows an example of display in a case where a jump is made from a work screen image to a chat log text file.

A chat log is displayed in a window 1501 separate from the work screen image.

In each terminal apparatus 100, when a chat log associated with an attention point is referred to, a command in a chat message can be transmitted from the terminal apparatus 100 to the collaboration server 200. That is, the user of the terminal apparatus 100 designates a desired past attention point by information indicating the position of the point as defined by the number of times the attention point was designed before the present time and information such as record anchor names, describes in a predetermined format described below a message including a command to return (move) the present attention point to the designated point, and transmits the message. This message is analyzed by the chat text analysis section 222 and the command analysis section 224 in the collaboration server 200. Thereafter, the command obtained as an analysis result is sent to the command processing section 234 and the chat log stored in the chat log storage section 243 and associated with the designated past attention point is read out on the basis of this command and is distributed to the terminal apparatuses 100.

A method of extracting from a chat text a command necessary for control of progress in collaboration work using the chat system in this embodiment will be described.

Extraction of a command from a chat text is executed in the collaboration server 200 participating as a client in a chat session and is also executed in each terminal apparatus 100 having the helper function.

As a basic technique, a technique of adding a prescribed reserved word to the beginning of a chat message for transmitting a command. Reserved words may be arbitrarily set. For example, "Command:" may be used as a reserved word in a case where a command is transmitted to the collaboration server 200, and "Helper:" may be used as a reserved word in a case where a command is transmitted to the helper in the terminal apparatus 100 to execute updating of a work screen image (reloading of a Web page). That is, if a chat message begins with "Command:", it is recognized as a command to the collaboration server 200. If a chat message begins with "Helper:", it is recognized as a command to the terminal apparatus 100. The operations of the collaboration server 200 and the terminal apparatus 100 helper with respect messages will be described by assuming that reserved words are set in this manner.

The operation of the collaboration server 200 will first be described.

Figure 16:
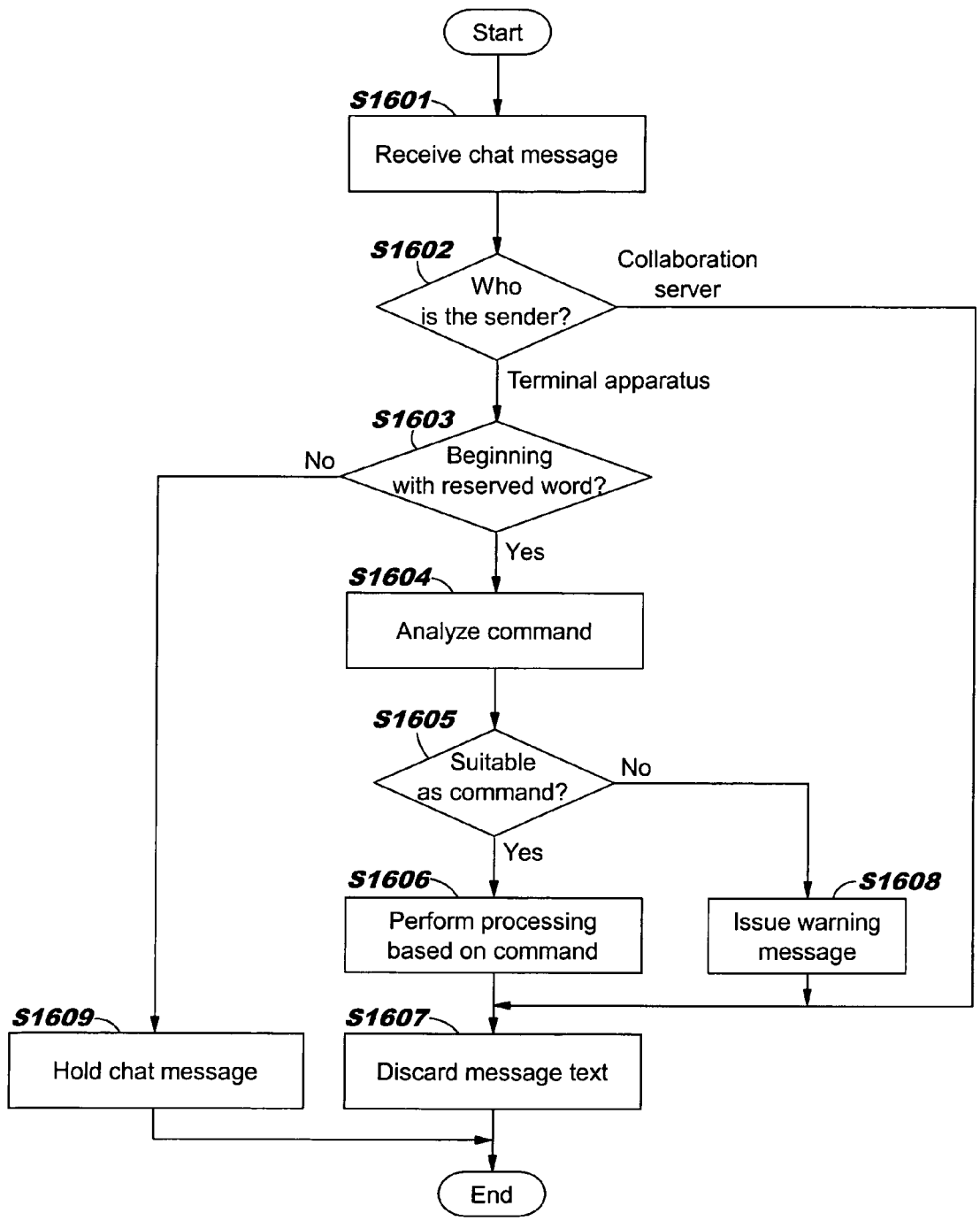
FIG. 16 is a flowchart showing the flow of message processing in the collaboration server of this embodiment.

FIG. 16 is a flowchart showing the flow of message processing in the collaboration server 200.

Referring to FIG. 16, the chat client section 221 of the collaboration server 200 receives a chat message (step S1601) and identifies the sender of the chat message on the basis of HTTP_USER_AGENT (user agent) or the like (step S1602). If the sender is the collaboration server 200 itself, it is determined that the chat message is a warning message, a notice message or the like for control of progress in collaborative work. Then the text is ignored and the chat message is discarded (step S1607).

If the sender of the chat message is one of the terminal apparatus 100, then the chat text analysis section 222 checks whether or not the chat message begins with the reserved word "Command:" (step S1603). If the chat message does not begin with the reserved word "Command:," it is recognized as an ordinary chat message exchanged among the terminal apparatuses 100 and is held in the chat recording section 223 (step S1609). The chat message held in the chat recording section 223 is stored in the chat log storage section 243 while being associated with an attention point with the movement of the attention point, as described above.

If the chat message begins with the reserved word "Command:," it is a command to the collaboration server 200 and the command analysis section 224 then analyzes the contents of this command (step S1604). If the command is a suitable command executable by the collaboration server 200, the command analysis section 224 delivers this command to the command processing section 234 in the control layer. The component necessary for processing based on this command is called up by the command processing section 234 to execute the processing (steps S1605 and S1606). The text itself in the chat message including this command is discarded (step S1607).

If it is determined by command analysis that the command is not a suitable command, the chat command generation section 225 issues a warning message that the command is improper and not executable (S1608). This message is distributed to the terminal apparatuses 100 as a chat message. The text itself in the chat message including this command is discarded (step S1607).

An example of transmission of command through a chat message is transmission of a request for reference to the chat log associated with the above-described past attention point. In this case, if there is a need to refer to the chat log by returning to the position of the record anchor <ANCHOR "No. 2">, a chat message:

Command: back to No. 2 is described by using this record anchor name and transmitted. This message is recognized as a command to the collaboration server 200 because of the "Command:" at the beginning and the content "back to No. 2" is analyzed.

The operation of the terminal apparatus 100 helper will next be described.

Figure 17:
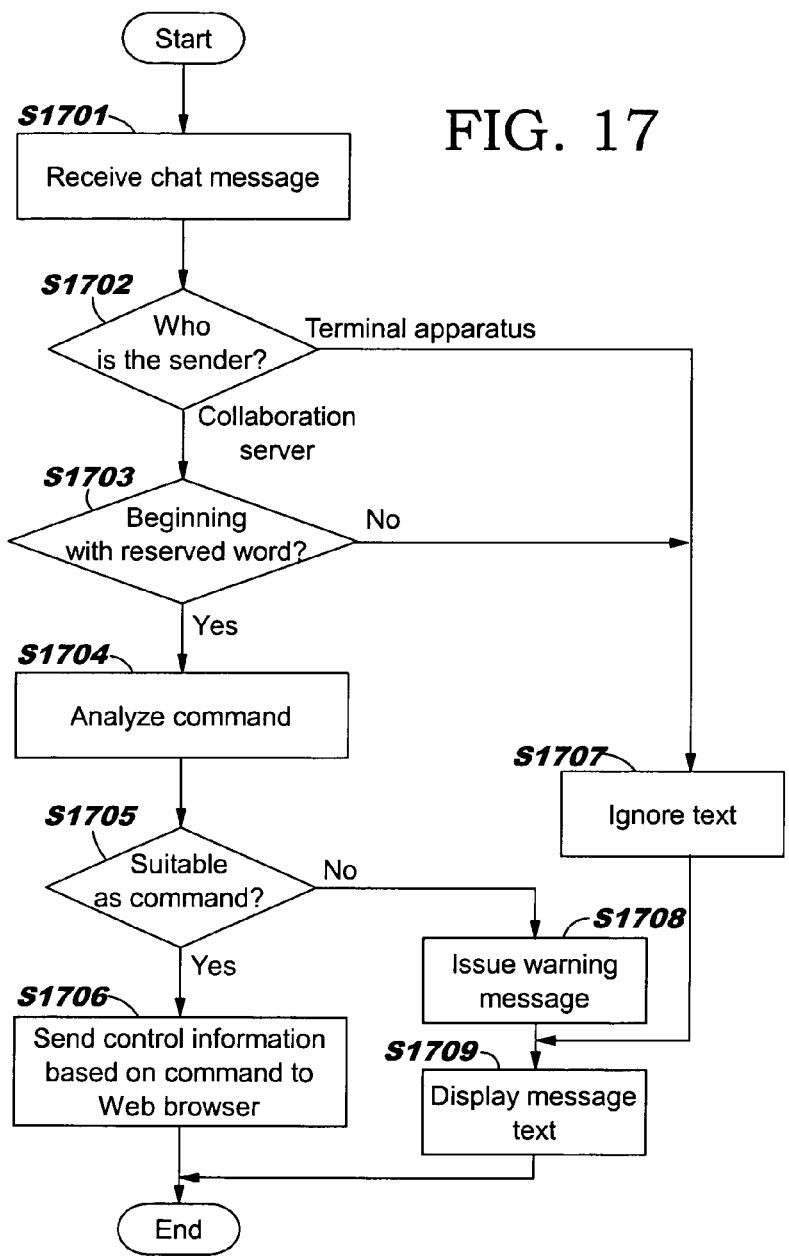
FIG. 17 is a flowchart showing the overall flow of message processing in the terminal apparatus of this embodiment.

FIG. 17 is a flowchart showing the overall flow of message processing in the terminal apparatus 100.

Referring to FIG. 17, the communication section 110 of the terminal apparatus 100 receives a chat message and the chat control section 140 accepts this chat message. The helper in the Web display control section 120 obtains this chat message from the chat control section 140 (step S1701) and identifies the sender of this chat message on the basis of HTTP_USER_AGENT (user agent) or the like (step S1702). If the sender is one of the terminal apparatuses 100, it is determined that this message is an ordinary chat message exchanged among the terminal apparatuses 100, the text contained in the message is ignored (step S1707). Consequently, this text is displayed under the control of the chat control section 140 in the chat window displayed on the display unit of the terminal apparatus 100 (step S1709).

If the sender of the chat message is the collaboration server 200, then the helper checks whether or not the chat message begins with the reserved word "Helper:" (step S1703). If the chat message does not begin with the reserved word "Helper:," it is recognized as an ordinary notice message such as warning from the collaboration server 200 to each terminal apparatus 100 (not a command for control of progress in collaboration work) and the text is ignored (step S1707). As a result, the text is displayed under the control of the chat control section 140 in the chat window displayed on the display unit of the terminal apparatus 100 (step S1709).

If the chat message begins with the reserved word "Helper:," it is a command for control of progress in collaboration work, which should be processed by the helper. The helper then analyzes the contents of the command (step S1704). If the command is a suitable command executable by the Web display control section 120, the helper sends control information based on the command to the Web browser (steps S1705 and S1706). Control of display on a work screen image Web page (operations including reloading and opening a window) is performed.

If it is determined by command analysis that the command is not a suitable command, the helper issues a warning message that the command is improper and not executable (step S1708). This message is sent to the chat control section 140 and displayed in the chat window displayed on the display unit of the terminal apparatus 100 (step S1709).

In a case where helper is not implemented in the terminal apparatus 100 or the processing ability of the terminal apparatus 100 is so low that the helper cannot be used, the above-described chat message analysis and automatic browser control by the helper are, as a matter of course, not executed. In such a case, the chat message including the command to the helper is displayed in the chat window as well as the ordinary chat message. Therefore, the user of the terminal apparatus 100 can read the displayed message and perform a necessary operation such as reloading of the work screen image according to the contents of the message, thereby making a progress in collaborative work.

Figure 18:
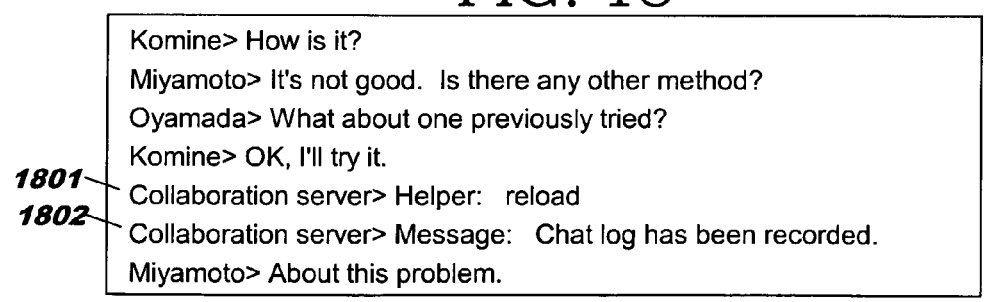
FIG. 18 is a diagram showing a chat log when a reloading instruction is provided to each terminal apparatus in an example of sending of a command by means of a chat message in this embodiment.

FIG. 18 is a diagram showing a chat log with respect to an example of transmission of a command through a chat message in a case where a reloading instruction is provided to each terminal apparatus 100.

A chat message 1801 shown in FIG. 18 is a reloading instruction command. When as shown in the figure a chat message:

Helper: reload is distributed as shown in the figure, the helper in the terminal apparatus 100 in which the helper is implemented determines from "Helper:" at the beginning of the chat message that the chat message is a command to the terminal apparatus 100, and analyzes the content of "reload."

When the attention point is moved, an information message such as chat message 1802 shown in FIG. 18 may be transmitted from the collaboration server 200 in order to clearly show a chat discontinuity to the user of the terminal apparatus 100.

As described above, in the collaboration system of this embodiment, when an attention point is set in a predetermined one of the terminal apparatuses 100, a Web page provided as a work screen image is reloaded in each terminal apparatus 100 and the attention point is displayed at the top of the work screen image. Therefore, even in a case where the display units of the terminal apparatuses 100 participating in collaborative work differ in display size and resolution from each other, an attention point can be displayed in the work screen image at all times in all the terminal apparatuses 100 (work screen image synchronization).

Figure 19:
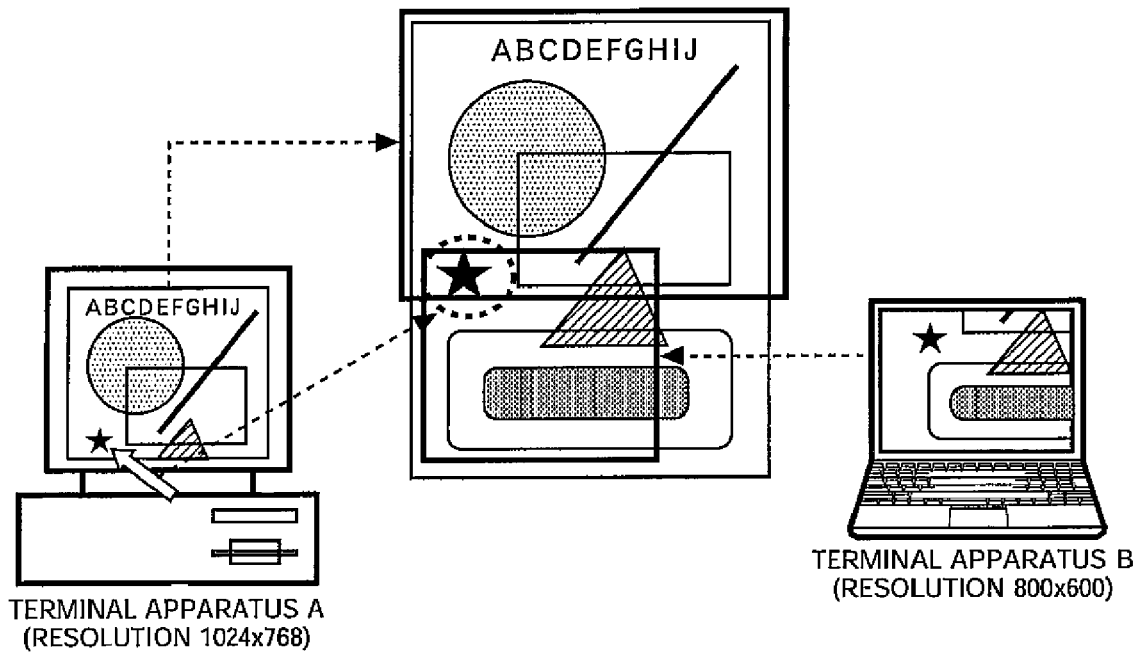
FIG. 19 is a diagram showing, as an example of the form of a tool used in this embodiment, a state in which a "sharing start" button and an "attention point notice" button are placed in a separate window.
Figure 20:
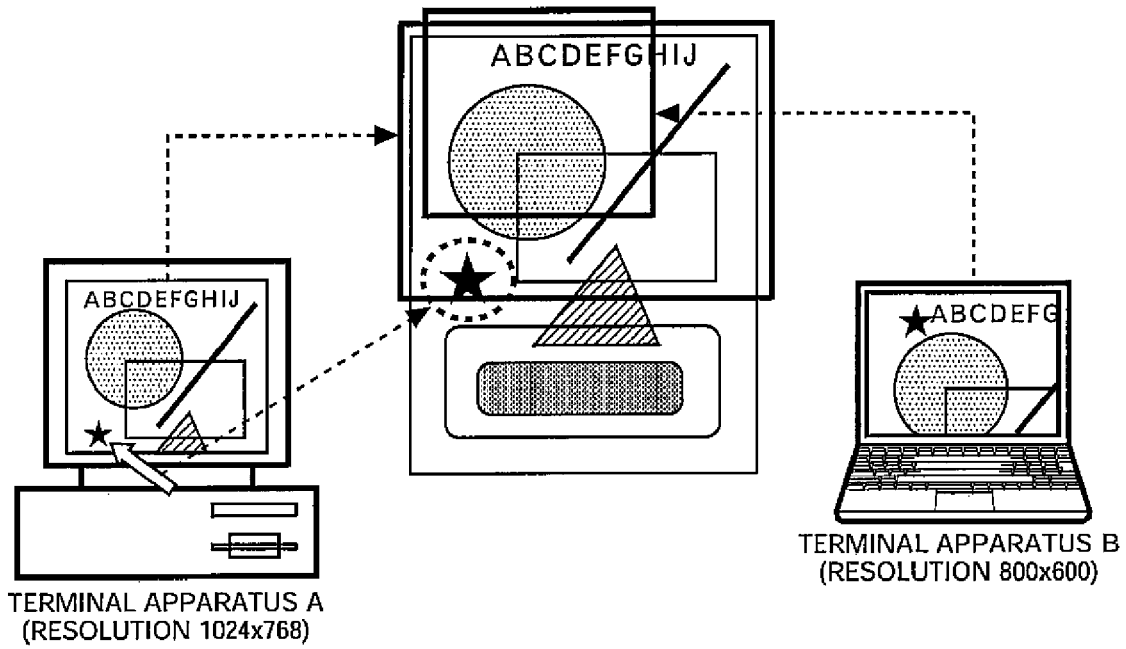
FIG. 20 is a diagram showing an example of display of a work screen image on display units of different resolutions in a conventional collaboration system.

FIG. 19 is a diagram showing an example of display of work screen images on display units differing in resolution in this embodiment.

Referring to FIG. 19, when a predetermined point (indicated by a star-like symbol ★ in FIG. 19) in the work screen image displayed on the high-resolution terminal apparatus A is determined as an attention point, the work screen image is reloaded to unfailingly display the attention point in the work screen image, thereby making it possible to easily recognize to which point in the work screen image attention is directed in collaborative work.

In this embodiment, a Web page provided as a work screen image is reloaded to synchronize images formed as the work screen image and, therefore, progress in collaboration work can be controlled by sending a request for reloading of the work screen image by means of a chat message from the collaboration server 200 to the terminal apparatuses 100 in a chat among the collaboration server 200 and the terminal apparatuses 100 participating as clients. Therefore, an ordinary Web browser and an ordinary chat application may be implemented in the terminal apparatuses 100 and there is no need for a special application program for work screen image synchronization. Also, the selection of the kinds of OSs, Web browsers and chat applications is not particularly restricted. Therefore, even low-function information devices such as PDAs and portable telephones can easily take part in the system of this embodiment as terminal apparatuses 100.

Further, according to the present invention, data transmitted and received among the apparatuses is HTML files forming Web pages, URLs for the HTML files, HTTP requests, responses to the requests, chat data and the like. Therefore the amount of data is small and the communication traffic can be reduced.

The invention claimed is:

1. A collaboration server connected to a plurality of terminal apparatuses through a network for assisting collaborative work among the plurality of terminal apparatuses, comprising:
at least one computer, including:
a work screen controller for obtaining, retaining, and distributing a Web page as a work screen used in collaborative work among said plurality of terminal apparatuses; and
a chat function performing unit for holding a log of texts exchanged in the chat, wherein the work screen controller accepts from one of the terminal apparatuses a request made by designating a point on the Web page and the work screen controller writes a dynamic anchor tag to a data file for the Web page that corresponds to the point designated by the request, and adds a name of the dynamic anchor tag to a uniform resource locator (URL) for the data file;
wherein the chat function performing unit analyzes texts exchanged in the chat to check whether or not a command to the collaboration server is contained, and, if such a command is contained, analyzes the contents of the command and causes a control system of the collaboration server to execute processing based on the command; and
wherein the chat function performing unit generates, in a command format readable by a control system of a Web browser provided in said terminal apparatuses, a chat message in which an operation instruction concerning the work screen is described, and distributes the chat message to each of the plurality of terminal apparatuses, the operation instruction comprising an instruction to each of the plurality of terminal apparatuses to reload the Web page to synchronize displayed states of the work screen image for each of the plurality of terminal apparatuses, such that the point at which the dynamic anchor tag is written is at the same location of the work screen for each of the plurality of terminal apparatuses.

2. The collaboration server according to claim 1, wherein each time the work screen controller accepts from one of the terminal apparatuses a request made by designating a point on the Web page, it moves the dynamic anchor tag to a position on the data file corresponding to the point designated by the request without changing the name of the dynamic anchor tag.

3. The collaboration server according to claim 1, wherein each time the work screen controller accepts from one of the terminal apparatuses a request made by designating a point on the Web page, it adds an anchor tag to the data file of the Web page in correspondence with the point designated by the request.

4. The collaboration server according to claim 3, wherein the chat function performing unit associates the log of the chat between an acceptance of the request and an acceptance of another request subsequently made by designating another point on the Web page with the dynamic anchor tag corresponding to a predetermined point on the Web page.

5. The collaboration server according to claim 2, wherein the work screen controller adds a record anchor tag to the data file for the Web page corresponding to a previous dynamic anchor, thereby providing an association between the log of texts exchanged in the chat with a corresponding previous dynamic anchor.

6. A collaboration system for assisting collaborative work among a plurality of terminal apparatuses interconnected through a network, comprising:
a collaboration server for obtaining, retaining, and distributing a Web page as a work screen used in collaborative work among said plurality of terminal apparatuses; and
a chat server for managing chat sessions;
wherein said collaboration server participates in chat sessions managed by said chat server as a chat client; and
wherein said collaboration server includes: a request acceptance system for accepting a request from one of the plurality of terminal apparatuses that designates a point on the Web page; a work screen control system for writing a dynamic anchor tag to a data file for the Web page that corresponds to the point designated by the request and adding a name of the dynamic anchor tag to a uniform resource locator (URL) for the data file; and a chat message generation system for generating a chat message containing an operation instruction, the operation instruction comprising an instruction to the plurality of terminal apparatuses to reload the Web page to synchronize displayed states of the work screen image for each of the plurality of terminal apparatuses, such that the point at which the dynamic anchor tag is written is at the same location of the work screen for each of the plurality of terminal apparatuses.

7. The collaboration system according to claim 6, wherein the collaboration server includes:
a storage system for storing a log of texts exchanged in the chat between an acceptance of a request made by designating a point on the Web page and an acceptance of another request subsequently made by designating another point on the Web page with the anchor tag corresponding to the point on the Web page, while associating the log with the point on the Web.

8. The collaboration system according to claim 6, wherein said collaboration server includes:
an analysis system for analyzing the texts exchanged in the chat to check whether or not a command to said collaboration server is contained, and, if such a command is contained, analyzing the contents of the command; and
a control system for executing processing based on the command recognized by said analysis system.

9. The collaboration system according to claim 6, wherein said chat server has a storage storing a session management table in which information for identification of sessions in the chat and information for identification of the clients participating in the sessions are stored while being associated with each other, and wherein information for identification of said collaboration server is registered as a client in the session management table.

10. The collaboration system according to claim 6, wherein the work screen control system further comprises adding a record anchor tag to the data file for the Web page corresponding to a previous dynamic anchor, thereby providing an association between the log of texts exchanged in the chat with a corresponding previous dynamic anchor.

11. A collaboration assisting method for a collaboration server connected to a plurality of terminal apparatuses through a network to assist collaborative work among said plurality of terminal apparatuses, comprising:

a first step of distributing by the collaboration server a Web page, which is a work screen stored in a storage device for collaborative work, to the plurality of terminal apparatuses;

a second step performed by said collaboration server of receiving a request from one of the plurality of terminal apparatuses that designates a point on the Web page, updating a data file for the Web page according to the request by writing a dynamic anchor tag to the data file for the Web page that corresponds to the point designated by the request and adding a name of the dynamic anchor tag to a uniform resource locator (URL) for the data file, and storing the data file in the storage device, the second step further comprising receiving a chat message transmitted from one of the terminal apparatuses in the chat and analyzing a text in the chat message; analyzing, if the text is a command as a result of the analysis of the text, the contents of the command; and executing processing required according to the command on the basis of the result of analysis of the command; and a third step of sending by the collaboration server an operation instruction, the operation instruction comprising an instruction to the plurality of terminal apparatuses to reload the Web page to synchronize displayed states of the work screen image for each of the plurality of terminal apparatuses, such that the point at which the dynamic anchor tag is written is at the same location of the work screen for each of the plurality of terminal apparatuses.

12. The collaboration assisting method according to claim 11, further comprising: adding a record anchor tag to the data file for the Web page corresponding to a previous dynamic anchor, thereby providing an association between the log of texts exchanged in the chat with a corresponding previous dynamic anchor.

* * * * *